United States Patent
Jung et al.

(10) Patent No.: US 10,929,059 B2
(45) Date of Patent: *Feb. 23, 2021

(54) RESISTANCE SWITCHING MEMORY-BASED ACCELERATOR

(71) Applicants: MemRay Corporation, Seoul (KR);
YONSEI UNIVERSITY, UNIVERSITY—INDUSTRY FOUNDATION (UIF), Seoul (KR)

(72) Inventors: Myoungsoo Jung, Incheon (KR);
Gyuyoung Park, Incheon (KR); Jie Zhang, Incheon (KR)

(73) Assignees: MemRay Corporation, Seoul (KR);
Yonsei University, University-Industry Foundation (UIF), Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/032,675

(22) Filed: Jul. 11, 2018

(65) Prior Publication Data

US 2018/0321880 A1 Nov. 8, 2018

Related U.S. Application Data

(63) Continuation-in-part of application No. 15/344,734, filed on Nov. 7, 2016.

(30) Foreign Application Priority Data

| Sep. 19, 2016 | (KR) | 10-2016-0119517 |
| Sep. 4, 2017 | (KR) | 10-2017-0112840 |
| Apr. 20, 2018 | (KR) | 10-2018-0046378 |

(51) Int. Cl.
*G06F 12/00* (2006.01)
*G06F 3/06* (2006.01)
(Continued)

(52) U.S. Cl.
CPC .......... *G06F 3/0659* (2013.01); *G06F 3/0604* (2013.01); *G06F 3/0652* (2013.01);
(Continued)

(58) Field of Classification Search
CPC .... G06F 3/0659; G06F 3/0604; G06F 3/0679; G06F 3/0652; G06F 3/0656; G06F 3/061;
(Continued)

(56) References Cited

U.S. PATENT DOCUMENTS

| 4,757,474 A | 7/1988 | Fukushi et al. |
| 6,782,445 B1 | 8/2004 | Olgiati et al. |

(Continued)

FOREIGN PATENT DOCUMENTS

| JP | 2003-502728 | 1/2003 |
| KR | 10-2007-0027755 | 3/2007 |

(Continued)

OTHER PUBLICATIONS

Joe Stam, Maximizing GPU Efficiency in Extreme Throughput Applications, GPU Technology Conference (Year: 2009).*

(Continued)

*Primary Examiner* — Kalpit Parikh
(74) *Attorney, Agent, or Firm* — Dinsmore & Shohl LLP

(57) ABSTRACT

A resistance switching memory-based accelerator configured to be connected to a host including a CPU and a system memory is provided. A resistance switching memory module includes a memory cell array including a plurality of resistance switching memory cells, and stores a kernel offloaded from the host. An accelerator core includes a plurality of processing elements, and the kernel is executed by a target processing element among the plurality of processing elements. An MCU manages a memory request generated in accordance with execution of the kernel by the target processing element. A memory controller is connected to the (Continued)

resistance switching memory module, and allows data according to the memory request to move between the resistance switching memory module and the target processing element, in accordance with the memory request transferred from the MCU. A network integrates the accelerator core, the plurality of processing elements, and the memory controller.

19 Claims, 23 Drawing Sheets

Related U.S. Application Data

(60) Provisional application No. 62/366,667, filed on Jul. 26, 2016.

(51) Int. Cl.
  *G06F 9/30* (2018.01)
  *G06F 13/16* (2006.01)
(52) U.S. Cl.
  CPC .......... *G06F 3/0656* (2013.01); *G06F 3/0679* (2013.01); *G06F 9/30043* (2013.01); *G06F 13/1668* (2013.01)
(58) Field of Classification Search
  CPC ............... G06F 3/0647; G06F 9/30043; G06F 13/1668; G06F 13/16; G06F 13/1663; G06F 12/0804; G06F 12/897; G06F 2212/1016
  See application file for complete search history.

(56) References Cited

U.S. PATENT DOCUMENTS

| | | | |
|---|---|---|---|
| 9,734,097 B2 | 8/2017 | Mirichigni et al. | |
| 9,824,751 B2 | 11/2017 | Kang | |
| 10,013,342 B2 | 7/2018 | Jung | |
| 2002/0144066 A1* | 10/2002 | Talreja | G11C 16/10 711/154 |
| 2006/0004951 A1 | 1/2006 | Rudelic et al. | |
| 2008/0147968 A1* | 6/2008 | Lee | G06F 11/1068 711/103 |
| 2009/0077346 A1 | 3/2009 | Steinert et al. | |
| 2011/0063903 A1 | 3/2011 | Kang et al. | |
| 2011/0173155 A1* | 7/2011 | Becchi | G06F 9/5044 707/610 |
| 2012/0124317 A1* | 5/2012 | Mirichigni | G11C 5/066 711/168 |
| 2014/0129753 A1 | 5/2014 | Schuette et al. | |
| 2014/0240327 A1* | 8/2014 | Lustig | G06T 1/20 345/505 |
| 2014/0281182 A1* | 9/2014 | Mirichigni | G06F 13/1689 711/104 |
| 2015/0039712 A1* | 2/2015 | Frank | H04L 67/40 709/212 |
| 2015/0089105 A1* | 3/2015 | Lu | G06F 9/442 710/269 |
| 2016/0012890 A1 | 1/2016 | Park et al. | |
| 2017/0060588 A1 | 3/2017 | Choi | |
| 2017/0199835 A1 | 7/2017 | Kim et al. | |

FOREIGN PATENT DOCUMENTS

| | | |
|---|---|---|
| KR | 10-2010-0076657 | 7/2010 |
| KR | 10-2011-0029402 | 3/2011 |
| KR | 10-2015-0076198 | 7/2015 |
| KR | 10-2016-0006034 | 1/2016 |
| KR | 10-2017-0005897 | 1/2017 |
| KR | 10-1693137 | 1/2017 |
| KR | 10-2017-0027125 | 3/2017 |
| KR | 10-2017-0064259 | 6/2017 |
| KR | 10-2017-0084969 | 7/2017 |
| KR | 10-2017-0095607 | 8/2017 |
| WO | 2014-065879 | 5/2014 |
| WO | 2014-105148 | 7/2014 |
| WO | 2016-064406 | 4/2016 |

OTHER PUBLICATIONS

Ahn, J., Kwon, D., Kim, Y., Ajdari, M., Lee, J., and Kim, J. DCS: a fast and scalable device-centric server architecture. In Proceedings of the 48th International Symposium on Microarchitecture (2015), ACM, pp. 559-571.
Anderson, T., Bui, D., Moharil, S., Narnur, S., Rahman, M., Lell, A., Biscondi, E., Shrivastava, A., Dent, P., Yan, M., et al. A 1.5 Ghz VLIW DSP CPU with integrated floating point and fixed point instructions in 40 nm CMOS. In Computer Arithmetic (ARITH), 2011 20th IEEE Symposium on (2011), IEEE, pp. 82-86.
Bae, Y.-C., Park, J.-Y., Rhee, S. J., Ko, S. B., Jeong, Y., Noh, K.-S., Son, Y., Youn, J., Chu, Y., Cho, H., et al. A 1.2 v 30nm 1.6 gb/s/pin 4gb LPDDR3 SDRAM with input skew calibration and enhanced control scheme. In Solid-State Circuits Conference Digest of Technical Papers (ISSCC), 2012 IEEE International (2012), IEEE, pp. 44-46.
Bergman, S., Brokhman, T., Cohen, T., and Silberstein, M. SPIN: Seamless operating system integration of peer-to-peer dma between ssds and gpus. In USENIX ATC (2017).
Cassuto, Y., Kvatinsky, S., and Yaakobi, E. Sneak-path constraints in memristor crossbar arrays. In Information Theory Proceedings (ISIT), 2013 IEEE International Symposium on (2013), IEEE, pp. 156-160.
Caulfield, A. M., Chung, E. S., Putnam, A., Angepat, H., Fowers, J., Haselman, M., Heil, S., Humphrey, M., Kaur, P., Kim, J.-Y., et al. A cloud-scale acceleration architecture. In Microarchitecture (MICRO), 2016 49th Annual IEEE/ACM International Symposium on (2016), IEEE, pp. 1-13.
Caulfield, A. M., Grupp, L. M., and Swanson, S. Gordon: An improved architecture for data-intensive applications. IEEE micro 30, 1 (2010).
Cho, S., Park, C., Oh, H., Kim, S., Yi, Y., and Ganger, G. R. Active disk meets flash: a case for intelligent SSDs. In Proceedings of the 27th international ACM conference on International conference on supercomputing (2013), ACM, pp. 91-102.
Cuppu, V., Jacob, B., Davis, B., and Mudge, T. A performance comparison of contemporary DRAM architectures. In ACM SIGARCH Computer Architecture News (1999), vol. 27, IEEE Computer Society, pp. 222-233.
De, A., Gokhale, M., Gupta, R., and Swanson, S. Minerva: Accelerating data analysis in next-generation SSDs. In Field-Programmable Custom Computing Machines (FCCM), 2013 IEEE 21st Annual International Symposium on (2013), IEEE, pp. 9-16.
Dong, X., and Xie, Y. AdaMS: Adaptive MLC/SLC phase-change memory design for file storage. In Design Automation Conference (ASP-DAC), 2011 16th Asia and South Pacific (2011), IEEE, pp. 31-36.
Gokhale, V., Jin, J., Dundar, A., Martini, B., and Culurciello, E. A 240 G-ops/s mobile coprocessor for deep neural networks. In Proceedings of the IEEE Conference on Computer Vision and Pattern Recognition Workshops (2014), pp. 682-687.
Gu, B., Yoon, A. S., Bae, D.-H., Jo, I., Lee, J., Yoon, J., Kang, J.-U., Kwon, M., Yoon, C., Cho, S., et al. Biscuit: A framework for near-data processing of big data workloads. In Computer Architecture (ISCA), 2016 ACM/IEEE 43rd Annual International Symposium on (2016), IEEE, pp. 153-165.
Hegde, G., Ramasamy, N., Kapre, N., et al. Caffepresso: an optimized library for deep learning on embedded Accelerator-based platforms. In Proceedings of the International Conference on Compilers, Architectures and Synthesis for Embedded Systems (2016), ACM, p. 14.
Horii, H., Yi, J., Park, J., Ha, Y., Baek, I., Park, S., Hwang, Y., Lee, S., Kim, Y., Lee, K., et al. A novel cell technology using N-doped

(56) References Cited

OTHER PUBLICATIONS

GeSbTe films for phase change RAM. In VLSI Technology, 2003. Digest of Technical Papers. 2003 Symposium on (2003), IEEE, pp. 177-178.

Hudgens, S., and Johnson, B. Overview of phase-change chalcogenide nonvolatile memory technology. MRS bulletin 29, 11 (2004), 829-832.

Instruments, T. TMS320C66x DSP CorePac user guide, 2011.

Intel. Intel SSD 750 series. URL:http://www.intel.com/content/www/us/en/solid-state-drives/solidstate-drives-750-series.html (2015).

JESD209-2B. Jedec standard: Low power double data rate 2 (LPDDR2). In JEDEC SSTA (2010).

Joo, Y., Niu, D., Dong, X., Sun, G., Chang, N., and Xie, Y. Energy- and endurance-aware design of phase change memory caches. In Design, Automation & Test in Europe Conference & Exhibition (Date), 2010 (2010), IEEE, pp. 136-141.

Kang, M., Park, T., Kwon, Y., Ahn, D., Kang, Y., Jeong, H., Ahn, S., Song, Y., Kim, B., Nam, S., et al. PRAM cell technology and characterization in 20nm node size. In Electron Devices Meeting (IEDM), 2011 IEEE International (2011), IEEE, pp. 3-1.

Kang, S., et al. A 0.1-um 1.8-V 256-Mb phase-change random access memory (PRAM) with 66-MHz synchronous burst-read operation. IEEE Journal of Solid-State Circuits (2007).

Lai, S. Current status of the phase change memory and its future. In Electron Devices Meeting, 2003. IEDM'03 Technical Digest. IEEE International (2003), IEEE, pp. 10-11.

Lee, B. C., Ipek, E., Mutlu, O., and Burger, D. Architecting phase change memory as a scalable DRAM alternative. In ACM SIGARCH Computer Architecture News (2009), vol. 37, ACM, pp. 2-13.

Micron. Mt29f2g08aabwp/mt29f2g16aabwp NAND Flash Datasheet.

Micron. Mt29f64g08cfabb/mt29f64g08cecbb NAND Flash Datasheet.

Micron. Mt29f64g08cbaaa/mt29f64g08cbaab NAND Flash Datasheet.

Nair, P. J., Chou, C., Rajendran, B., and Qureshi, M. K. Reducing read latency of phase change memory via early read and turbo read. In High Performance Computer Architecture (HPCA), 2015 IEEE 21st International Symposium on (2015), IEEE, pp. 309-319.

Niu, D., Xu, C., Muralimanohar, N., Jouppi, N. P., and Xie, Y. Design trade-offs for high density cross-point resistive memory. In Proceedings of the 2012 ACM/IEEE international symposium on Low power electronics and design (2012), ACM, pp. 209-214.

Numonyx. Omneo, P8P PCM, 128-mbit parallel phase change memory datasheet.

Otterness, N., Yang, M., Rust, S., Park, E., Anderson, J. H., Smith, F. D., Berg, A., and Wang, S. An evaluation of the NVIDIA TX1 for supporting real-time computer-vision workloads. In Real-Time and Embedded Technology and Applications Symposium (RTAS), 2017 IEEE (2017), IEEE, pp. 353-364.

Parallella. Epiphany-iii 16-core microprocessor. http://www.adapteva.com/epiphanyiii/.

Pouchet, L.-N. PolyBench: the polyhedral benchmark suite. URL: http://web.cs.ucla.edu/~pouchet/software/polybench/ (2012).

Qureshi, M. K., Franceschini, M. M., Jagmohan, A., and Lastras, L. A. PreSET: improving performance of phase change memories by exploiting asymmetry in write times. ACM SIGARCH Computer Architecture News 40, 3 (2012), 380-391.

Seshadri, S., Gahagan, M., Bhaskaran, M. S., Bunker, T., De, A., Jin, Y., Liu, Y., and Swanson, S. Willo: A user-programmable SSD. In OSDI (2014), pp. 67-80.

Solca, R., Kozhevnikov, A., Haidar, A., Tomov, S., Dongarra, J., and Schulthess, T. C. Efficient implementation of quantum materials simulations on distributed CPU-GPU systems. In Proceedings of the International Conference for High Performance Computing, Networking, Storage and Analysis (2015), ACM, p. 10.

Texas-Instruments. TMS320c6678 multicore fixed and floatingpoint digital signal processor.

Ti. Multicore software development kit. URL: https://training.ti.com/multicore-software-development-kit-mcsdkkeystone-devices (2011).

Ti. Multicore application deployment (MAD) utilities. URL: http://processors.wiki.ti.com/index.php/MAD-Utils-User-Guide (2014).

Ti. Ti code generation tools. URL: http://processors.wiki.ti.com/index.php/Category:Compiler (2014).

Tiwari, D., Boboila, S., Vazhkudai, S. S., Kim, Y., Ma, X., Desnoyers, P., and Solihin, Y. Active flash: towards energyefficient, in-situ data analytics on extreme-scale machines. In FAST (2013), pp. 119-132.

Tseng, H.-W., Zhao, Q., Zhou, Y., Gahagan, M., and Swanson, S. Morpheus: creating application objects efficiently for heterogeneous computing. In Computer Architecture (ISCA), 2016 ACM/IEEE 43rd Annual International Symposium on (2016), IEEE, pp. 53-65.

Wang, J., Dong, X., Sun, G., Niu, D., and Xie, Y. Energy-efficient multi-level cell phase-change memory system with data encoding. In Computer Design (ICCD), 2011 IEEE 29th International Conference on (2011), IEEE, pp. 175-182.

Wang, Y., Anderson, M. J., Cohen, J. D., Heinecke, A., Li, K., Satish, N., Sundaram, N., Turk-Browne, N. B., and Willke, T. L. Full correlation matrix analysis of fMRI data on intel xeon phi coprocessors. In Proceedings of the International Conference for High Performance Computing, Networking, Storage and Analysis (2015), ACM, p. 23.

Wong, H.-S. P., Raoux, S., Kim, S., Liang, J., Reifenberg, J. P., Rajendran, B., Asheghi, M., and Goodson, K. E. Phase change memory. Proceedings of the IEEE 98, 12 (2010), 2201-2227.

Xilinx. Xilinx zynq-7000 all programmable SoC ZC706 evaluation kit. https://www.xilinx.com/support/documentation/boards and kits/zc706/ug954-zc706-eval-board-xc7z045-ap-soc.pdf.

Xu, C., Niu, D., Muralimanohar, N., Balasubramonian, R., Zhang, T., Yu, S., and Xie, Y. Overcoming the challenges of crossbar resistive memory architectures. In High Performance Computer Architecture (HPCA), 2015 IEEE 21st International Symposium on (2015), IEEE, pp. 476-488.

Yamazaki, I., Kurzak, J., Luszczek, P., and Dongarra, J. Randomized algorithms to update partial singular value decomposition on a hybrid CPU/GPU cluster. In Proceedings of the International Conference for High Performance Computing, Networking, Storage and Analysis (2015), ACM, p. 59.

Yoshioka, K., Johguchi, K., and Takeuchi, K. High density NAND phase change memory with block-erase architecture to compromise write and disturb requirements. In Memory Workshop (IMW), 2012 4th IEEE International (2012), IEEE, pp. 1-4.

Young, V., Nair, P. J., and Qureshi, M. K. Deuce: Write-efficient encryption for non-volatile memories. In ACM SIGARCH Computer Architecture News (2015), vol. 43, ACM, pp. 33-44.

Zhang, J., Donofrio, D., Shalf, J., Kandemir, M. T., and Jung, M. Nvmmu: A non-volatile memory management unit for heterogeneous GPU-SSD architectures. In Parallel Architecture and Compilation (PACT), 2015 International Conference on (2015), IEEE, pp. 13-24.

J. Albericio et al., "Cnvlutin: Ineffectual-neuron-free deep convolutional neural network computing" in ISCA, Jun. 18, 2016.

Y.H.Chen et al., "Eyeriss: A spatial architecture for energy-efficient dataflow for convolutional neural networks" In ISCA, Jun. 2016.

P. Chi et al., "A novel processing-in-memory architecture for neural network computation in reram-based main memory"in ISCA, Jun. 2016.

JESD209-2B(Revision of JESD209-2A, Oct. 2009), "Jedec standard: Low power double data rate 2 (Ipddr2)", JEDEC Solid State Technology Association, Feb. 2010.

D. Kim et al., "Neurocube: A programmable digital neuromorphic architecture with high-density 3d memory", ISCA, Jun. 2016.

V. V. Kindratenko et al., "Gpu clusters for high-performance computing", IEEE International Conference on Cluster Computing and Workshops, Aug. 31 2009.

J. Kruger and R. Westermann, Linear algebra operators for gpu implementation of numerical algorithms, ACM Trans. Graph, vol. 22 Issue 3, Jul. 2003, pp. 908-916.

Y. Xie., "Modeling, architecture, and applications for emerging memory technologies", IEEE Design Test of Computers, Feb. 4, 2011.

Product Specification, "Spartan-6 family overview", Xilinx, Inc., DS160 (v2.0), Oct. 25, 2011.

\* cited by examiner

RESISTANCE SWITCHING MEMORY-BASED ACCELERATOR

CROSS-REFERENCE TO RELATED APPLICATION

This application is a continuation-in-part of U.S. patent application Ser. No. 15/344,734 filed on Nov. 7, 2016, and claims priority to and the benefit of U.S. Provisional Application No. 62/366,667 filed on Jul. 26, 2016, and Korean Patent Applications Nos. 10-2016-0119517 filed on Sep. 19, 2016, 10-2017-0112840 filed on Sep. 4, 2017, and 10-2018-0046378 filed on Apr. 20, 2018. The entire contents of the aforementioned applications are incorporated herein by reference.

BACKGROUND

(a) Field

The described technology generally relates to a resistance switching memory-based accelerator.

(b) Description of the Related Art

Multi-core based accelerators such as graphics processing units (GPUs) or many integrated cores (MICs) have in the recent years improved their computation power by employing hundreds to thousands of cores.

The accelerators can process more data than they have ever had before via parallelism, but use a non-volatile memory, for example a solid state disk (SSD), connected to a host machine to process large sets of data.

However, the accelerator and the non-volatile memory are disconnected from each other and are managed by different software stacks. Consequently, many unnecessary software interventions and data movements/copies exist in order to read data from the non-volatile memory or write data to the non-volatile memory. These overheads causes the speedup improvement to be not significant compared to the accelerator performance and a large amount of energy to be consumed.

SUMMARY

An embodiment of the present invention provides a resistance switching memory-based accelerator for removing unnecessary software inventions and data movements/copies.

According to an embodiment of the present invention, a resistance switching memory-based accelerator configured to be connected to a host including a central processing unit (CPU) and a system memory is provided. The resistance switching memory-based accelerator includes a resistance switching memory module, an accelerator core, a memory controller unit (MCU), a memory controller, and a network. The resistance switching memory module includes a memory cell array including a plurality of resistance switching memory cells, and stores a kernel offloaded from the host. The accelerator core includes a plurality of processing elements, and the kernel is executed by a target processing element among the plurality of processing elements. The MCU manages a memory request generated in accordance with execution of the kernel by the target processing element. The memory controller is connected to the resistance switching memory module, and allows data according to the memory request to move between the resistance switching memory module and the target processing element, in accordance with the memory request transferred from the MCU. The network integrates the accelerator core, the plurality of processing elements, and the memory controller.

The data according to the memory request may move between the resistance switching memory module and the target processing element without assistance of an operating system (OS) of the host.

The target processing element may access the resistance switching memory module through the memory request without a modification of an existing load/store instruction.

The MCU may be included in a processing element other than the plurality of processing elements.

The MCU may be included in the target processing element.

The resistance switching memory module may further include a plurality of row data buffers including a first row data buffer and a second row data buffer. The plurality of resistance switching memory cells may be divided into a plurality of partitions including a first partition and a second partition. In this case, the memory controller may process a first operation according to a first memory request and a second operation according to a second memory request in parallel, the first operation of bringing first data from the first partition to the first row data buffer, and the second operation of moving second data, which have been transferred from the second partition to the second row data buffer, to the target processing element corresponding to the second memory request.

The resistance switching memory module may further include a plurality of row address buffers and a plurality of row data buffers, and the plurality of resistance switching memory cells may be divided into a plurality of partitions. In this case, the memory controller may perform three-phase addressing. The three-phase addressing may include a preactive phase for storing an upper address of a row address, which is divided into at least the upper address and a lower address, for accessing the resistance switching memory module in accordance with the memory request, to a target row address buffer among the plurality of row address buffers, an active phase for bringing read data from the memory cell array to a target row data buffer among the plurality of row data buffers based on a row address composed by merging the lower address with the upper address stored to the target row address buffer, in a case of a read, and a read/write phase for transferring the read data from the target row data buffer to the target processing element.

The resistance switching memory module may further include an overlay window including a set of control registers and a program buffer. In a case of a write, write data may be stored to the program buffer at the active phase when the row address is within an address range of the overlay window, and the write data stored to the program buffer may be programmed to the memory cell array at the read/write phase.

The plurality of partitions may include a first partition and a second partition, and In this case, the memory controller may perform the read/write phase for the first partition in accordance with a first memory request while performing the preactive phase and the active phase for the second partition in accordance with a second memory request.

The memory controller may perform selectional erasing for setting a resistance switching memory cells corresponding to addresses to be overwritten by the execution of the kernel to a reset status.

The memory controller may perform the selectional erasing before the execution of the kernel.

The MCU may store a memory address of the kernel stored to the resistance switching memory module to a cache of the target processing element as a boot address, for execution of the kernel.

The resistance switching memory-based accelerator may further include a power sleep controller that controls a sleep mode of the target processing element. In this case, the MCU may put the target processing element in the sleep mode using the power sleep controller before storing the memory address of the kernel to the target processing element, and revoke the target processing element using the power sleep controller after storing the memory address of the kernel to the target processing element.

The target processing element may include an L2 cache, a first on-chip memory controller that is connected to the MCU, generates the memory request, and transfers the memory request to the MCU, and a second on-chip memory controller that is connected to the L2 cache, and moves the data between the L2 cache and the resistance switching memory module.

The resistance switching memory module may include a phase-change memory module, a resistive memory module, or a magnetoresistive memory module.

According to another embodiment of the present invention, a resistance switching memory-based accelerator configured to be connected to a host including a CPU and a system memory is provided. The resistance switching memory-based accelerator includes a resistance switching memory module, an accelerator core, an MCU, a memory controller, and a network. The resistance switching memory module stores kernels offloaded from the host, and includes a plurality of resistance switching memory cells divided into a plurality of partitions including a first partition and a second partition, and a plurality of row data buffers including a first row data buffer and a second row data buffer. The accelerator core includes a plurality of processing elements, each kernel being executed by a corresponding target processing element among the plurality of processing elements. The MCU manages memory requests generated in accordance with execution of each kernel by the target processing element. The memory controller is connected to the resistance switching memory module, and processes a first operation in accordance with a first memory request and a second operation in accordance with a second memory request in parallel, the first operation of bringing first data from the first partition to the first row data buffer, and the second operation of moving second data from the second row data buffer to the target processing element corresponding to the second memory request; and the network integrates the resistance switching memory module, the accelerator core, and the memory controller.

The second data may have been transferred from the second partition to the second row data buffer before the memory controller brings the first data from the first partition to the first row data buffer.

The memory controller may perform three-phase addressing including a preactive phase, an active phase, and a read/write phase. In this case, the read/write phase for the second data may be performed while the preactive phase and the active phase for the first data are performed.

According to yet another embodiment of the present invention, a resistance switching memory-based accelerator configured to be connected to a host including a CPU and a system memory is provided. The resistance switching memory-based accelerator includes a resistance switching memory module, an accelerator core, an MCU, a memory controller, and a network. The resistance switching memory module stores a kernel offloaded from the host and includes a memory cell array including a plurality of resistance switching memory cells. The accelerator core includes a plurality of processing elements, and the kernel is executed by a target processing element among the plurality of processing elements. The MCU manages memory requests generated in accordance with execution of the kernel by the target processing element. The memory controller is connected to the resistance switching memory module, allows data according to the memory request to move between the resistance switching memory module and the target processing element in accordance with the memory request transferred from the MCU, and programs predetermined data for addresses of the memory cell array to be overwritten by the execution of the kernel. The network integrates the resistance switching memory module, the accelerator core, and the memory controller.

The predetermined data may be data for setting resistance switching memory cells corresponding to the addresses to a reset status.

According to an embodiment of the present invention, unnecessary software inventions and data movements/copies can be removed by providing the resistance switching memory-based accelerator.

DETAILED DESCRIPTION OF THE EMBODIMENTS

Figure 1:
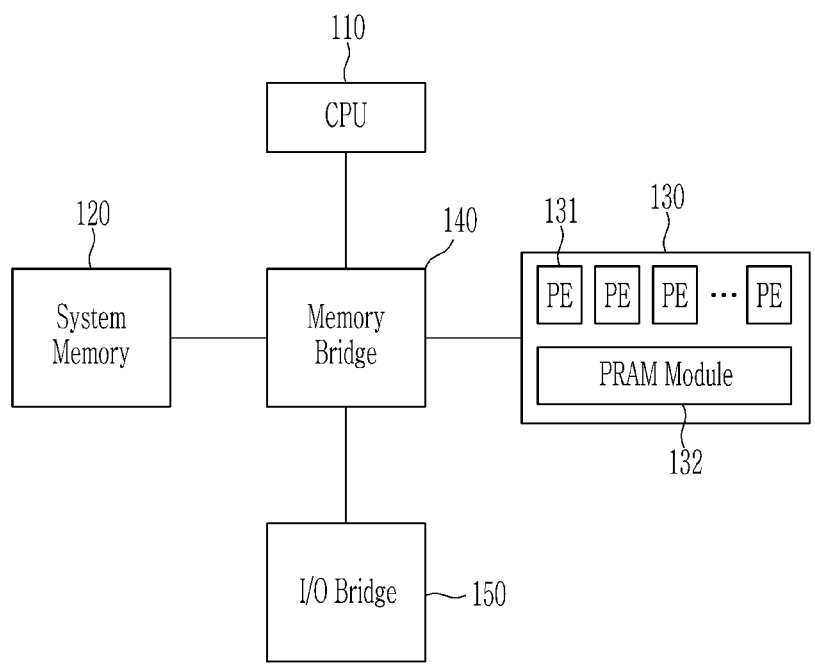
FIG. 1 is a schematic block diagram of a computing device according to an embodiment of the present invention.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

FIG. 1 is a schematic block diagram of a computing device according to an embodiment of the present invention. FIG. 1 shows an example of the computing device, and the computing device according to an embodiment of the present invention may be implemented by use of various structures.

Referring to FIG. 1, a computing device includes a CPU 110, a system memory 120, and a resistance switching memory-based accelerator 130.

Resistance switching memories include, as a non-volatile memory, a phase-change memory (PCM) using a resistivity of a resistance medium (phase-change material), a resistive memory using a resistance of a memory device, or a magnetoresistive memory. While the PCM, in particular, a phase-change random access memory (PRAM) is described as an example of the resistance switching memory in below embodiments, embodiments of the present invention are not limited to the PCM (or PRAM), but may be applicable to the resistive memory, for example, a resistive random access memory (RRAM) or the magnetoresistive memory, for example, a magnetoresistive random access memory (MRAM) such as a spin-transfer torque MRAM (STT-MRAM).

The system memory 120 is a main memory of the computing device and may be, for example, a dynamic random access memory (DRAM). An accelerator used in the PRAM-based accelerator 130 is a supplementary data processing device different from a general-purpose CPU, and may be computer hardware for performing data processing by supplementing functions of the CPU or performing the data processing independently of the CPU. A graphic processing unit (GPU) or many integrated core (MIC) device may be an example of this accelerator.

In some embodiments, the computing device may further include a memory bridge 140 for connecting the system memory 120 and the PRAM-based accelerator 130 with the CPU 110. The PRAM-based accelerator 130 may be connected to the memory bridge 140 that locates at the CPU-side. For example, the PRAM-based accelerator 130 may be connected to the memory bridge 140 via a PCIe (peripheral component interconnect express) interface. The memory bridge 140 may be, for example, a northbridge or a memory controller hub (MCH).

Further, the memory bridge 140 may be connected to an input/output (I/O) bridge 150. The I/O bridge 150 may be, for example, a southbridge or an I/O controller hub (ICH). The I/O bridge 150 may receive a user input from a user input device (not shown) and transfer the user input to the CPU 110 via the memory bridge 140.

While a conventional accelerator includes only a plurality of processing elements for parallelism, the PRAM-based accelerator 130 according to an embodiment of the present invention is an accelerator, which physically integrates a plurality of processing elements 131 corresponding to accelerator cores with a resistance switching memory module 132. As described above, the resistance switching memory module 132 is assumed as a PRAM module 132. As such, operations of the accelerator 130 can be performed without exchanging data with a storage device by integrating the accelerator 130 with the PRAM module 132 which is the non-volatile memory.

In some embodiments, a system including the CPU 110, the system memory 120, the memory bridge 140, and the I/O bridge 150 may be called a host.

The computing device may offload a kernel to the PRAM-based accelerator 130, which allows the PRAM-based accelerator 130 to directly execute the kernel. The kernel means any kind of function or program that can be executed on the accelerator 130. For example, these applications may be applications that offload computations from the host to the PRAM-based accelerator 130. These applications may be called kernels. Accordingly, the host may access the PRAM-based accelerator 130 to either offload the kernel or handle read/write of data. In this case, the processing elements of the PRAM-based accelerator 130 can directly access the PRAM module 132 of the PRAM-based accelerator 130 with executing the kernel. Therefore, many redundant memory allocations/releases and data copies that are required to read data from an external memory or write data to the external memory by the conventional accelerator can be removed.

Next, an example of the PRAM module 132 included in the PRAM-based accelerator 130 according to an embodiment of the present invention is described.

Figure 2:
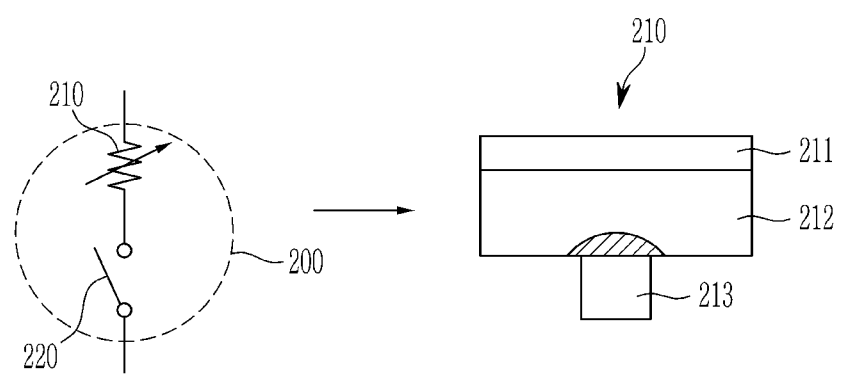
FIG. 2 schematically shows one memory cell in a PRAM.
Figure 3:
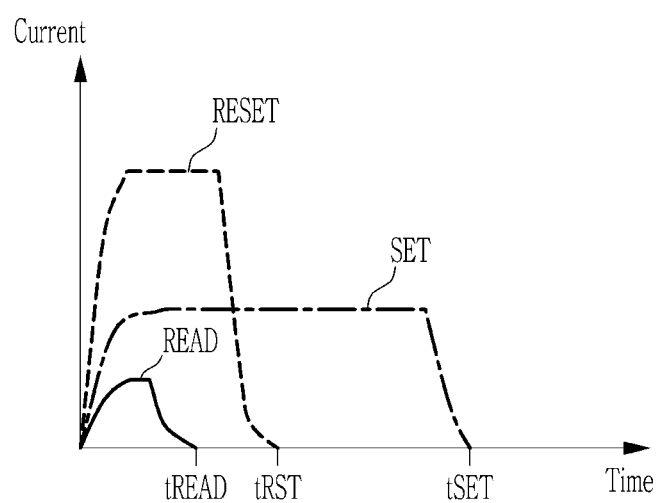
FIG. 3 shows a current applied to a memory cell shown in FIG. 2.
Figure 4:
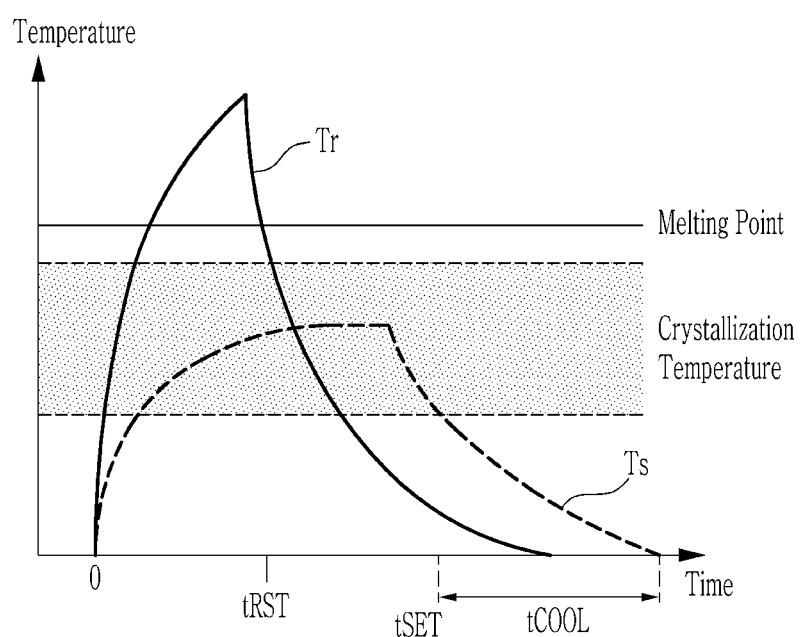
FIG. 4 shows a temperature change when a current shown in FIG. 3 is applied to a memory cell shown in FIG. 2.

FIG. 2 schematically shows one memory cell in a PRAM, FIG. 3 shows a current applied to a memory cell shown in FIG. 2, and FIG. 4 shows a temperature change when a current shown in FIG. 3 is applied to a memory cell shown in FIG. 2.

The memory cell shown in FIG. 2 is an example memory cell, and a memory cell of the PRAM according to embodiments of the present invention may be implemented in various forms.

Referring to FIG. 2, a memory cell 200 of a PRAM includes a phase change element 210 and a switching element 220. The switching element 220 may be implemented with various elements such as a transistor or a diode. The phase change element 210 includes a phase change layer 211, an upper electrode 212 formed above the phase change layer 211, and a lower electrode 213 formed below the phase change layer 211. For example, the phase change layer 210 may include an alloy of germanium (Ge), antimony (Sb) and tellurium (Te), which is referred to commonly as a GST alloy, as a phase change material.

The phase change material can be switched between an amorphous state with relatively high resistivity and a crystalline state with relatively low resistivity. A state of the phase change material may be determined by a heating temperature and a heating time.

Referring to FIG. 2 again, when a current is applied to the memory cell 200, the applied current flows through the lower electrode 213. When the current is applied to the memory cell 200 during a short time, a portion, of the phase change layer 211, adjacent to the lower electrode 213 is heated by the current. The cross-hatched portion of the phase change layer 211 is switched to one of the crystalline state and the amorphous state in accordance with the heating profile of the current. The crystalline state is called a set state and the amorphous state is called a reset state.

Referring to FIG. 3 and FIG. 4, the phase change layer 211 is programmed to the reset state when a reset pulse RESET with a high current is applied to the memory cell 200 during a short time tRST. If a temperature Tr of the phase change material reaches a melting point as the phase change material of the phase change layer 211 is heated by the applied reset pulse RESET, the phase change material is melted and then is switched to the amorphous state. The phase change layer 211 is programmed to the set state when a set pulse SET having a lower current than the reset pulse RESET is applied to the memory cell 200 during a time tSET being longer than the time tRST. If a temperature Ts of the phase change material reaches a crystallization temperature lower than the melting point as the phase change material is heated by the applied set current SET, the phase change material is transformed to the crystalline state. Since the reset state and the set state can be maintained when a pulse is applied with a lower current than the set pulse SET or with being shorter than the set pulse SET, data can be programmed to the memory cell 200.

The reset state and the set state may be set to data of "1" and "0," respectively, and the data may be sensed by measuring the resistivity of the phase change element 210 in the memory cell 200. Alternatively, the reset state and the set state may be set to data of "0" and "1," respectively.

Therefore, the data stored in the memory cell 200 can be read by applying a read pulse READ to the memory cell 200. The read pulse READ is applied with a low current during a very short time tREAD such that the state of the memory cell 200 is not changed. The current of the read pulse READ may be lower than the current of the set pulse SET, and the applied time of the read pulse READ may be shorter than the applied time tRST of the reset pulse RESET. Because the resistivity of the phase change element 210 in the memory cell 200 is different according to the state of the phase change element 210, the state of the phase change element 210, i.e., the data stored in the memory cell 200, can be read by a magnitude of a current flowing to the phase change element 210 or a voltage drop on the phase change element 210.

In one embodiment, the state of the memory cell 200 may be read by a voltage at the memory cell 200 when the read pulse READ is applied. In this case, since the phase change element 210 of the memory cell 200 has a relatively high resistance in the reset state, the state may be determined to the reset state in a case that the voltage sensed at the phase change element 210 is relatively high and to the set state in a case that the voltage sensed at the phase change element 210 is relatively low. In another embodiment, the state of the memory cell 200 may be read by an output current when a voltage is applied to the memory cell 200. In this case, the state may be determined to the reset state in a case that the current sensed at the phase change element 210 is relatively low and to the set state in a case that the current sensed at the phase change element 210 is relatively high.

As writing data is practically a sequence of reset and set processes in the PRAM, a write operation is much slower than a read operation by the reset pulse having the longer applied time.

Figure 5:
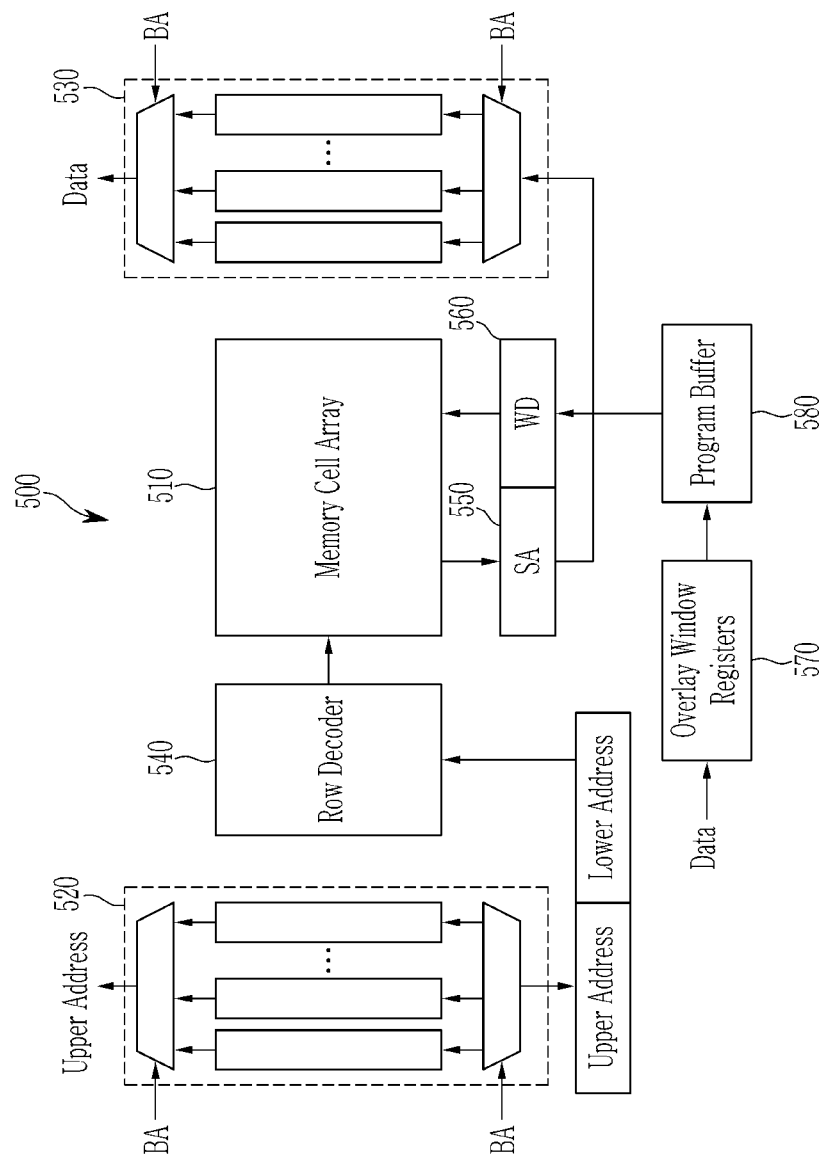
FIG. 5 is a schematic block diagram of a PRAM module in a PRAM-based accelerator according to an embodiment of the present invention.

FIG. 5 is a schematic block diagram of a PRAM module in a PRAM-based accelerator according to an embodiment of the present invention. A PRAM module shown in FIG. 5 may be a PRAM chip or a PRAM bank.

Referring to FIG. 5, a PRAM module 500 includes a memory cell array 510, a row address buffer 520, a row data buffer 530, a row decoder 540, a sense amplifier 550, and a write driver 560.

The memory cell array 510 includes a plurality of word lines (not shown) extending substantially in a row direction, a plurality of bit lines (not shown) extending substantially in a column direction, and a plurality of memory cells (not shown) that are connected to the word lines and the bit lines and are formed in a substantially matrix format. The memory cell may be, for example, a memory cell 200 described with reference to FIG. 2.

Both the row address buffer 520 and the row data buffer 530 form a row buffer. In order to address an asynchronous latency issue that the write operation is slower than the read operation, a plurality of row buffers, i.e., a plurality of row address buffers 520 and a plurality of row data buffers 530 are provided. Each row buffer is logically paired by the row address buffer 520 and the row data buffer 530, and is selected by a buffer address.

The row address buffer 520 stores commands and addresses (particularly, row addresses) from a memory controller (not shown). The row data buffer 530 stores data from the memory cell array 510.

In some embodiments, the PRAM module 500 may employ a non-volatile memory (NVM) interface to use the plurality of row buffers 520 and 530. In one embodiment, the non-volatile memory interface may be a double data rate (DDR) interface, for example, LPDDR2-NVM (low-power double data rate 2 non-volatile memory) interface. In this case, the row address buffer 520 receives a row address and a bank address via the NVM interface, and the row data buffer 530 outputs data via the NVM interface.

The row decoder 540 decodes a row address to select a target row from among the plurality of rows in the memory cell array 510. That is, the row decoder 540 selects a target word line for reading data or writing data from among the plurality of word lines of the memory cell array 510.

In some embodiments, the row address transferred from the memory controller may be divided into an upper address and a lower address. In this case, the upper address may be delivered to the row address buffer 520, and the lower address may be directly delivered to the row decoder 540. The row decoder 540 may combine the upper address accommodated in the row address buffer 520 with the directly delivered lower address to select the target row.

The sense amplifier 550 reads data stored in the memory cell array 510. The sense amplifier 550 may read the data, through a plurality of bit lines, from a plurality of memory cells connected to the word line selected by the row decoder 540. The write driver 560 writes the input data to the memory cell array 510. The write driver 560 may write the data, through a plurality of bit lines, to a plurality of memory cells connected to the word line selected by the row decoder 540.

In some embodiments, to address the issue that the write operation is slower than the read operation, the PRAM module 500 may first store the input data to a buffer and then write the stored data to the memory cell array 510. For this, the PRAM module 500 may include an overlay window 570 and 580 as memory-mapped registers. The overlay window may include overlay window registers 570 and a program buffer 580. In one embodiment, information on write data (for example, the first data address and the number of bytes to be programmed) may be written to the registers 570 and then the write data may be stored to the program buffer 580. Next, when a predetermined value is written to the overlay window registers 570, the data stored to the program buffer 580 may be written to the memory cell array 510. In this case, the memory controller may determine whether the write operation is completed by polling the overlay window registers 570.

Figure 6:
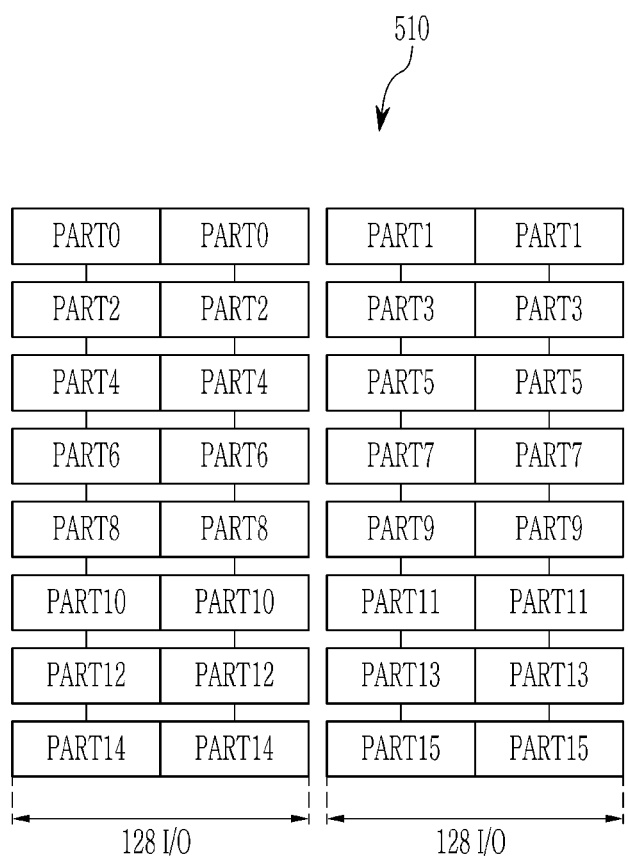
FIG. 6 shows an example of a partitioning scheme in a memory cell array of a PRAM module according to an embodiment of the present invention.
Figure 7:
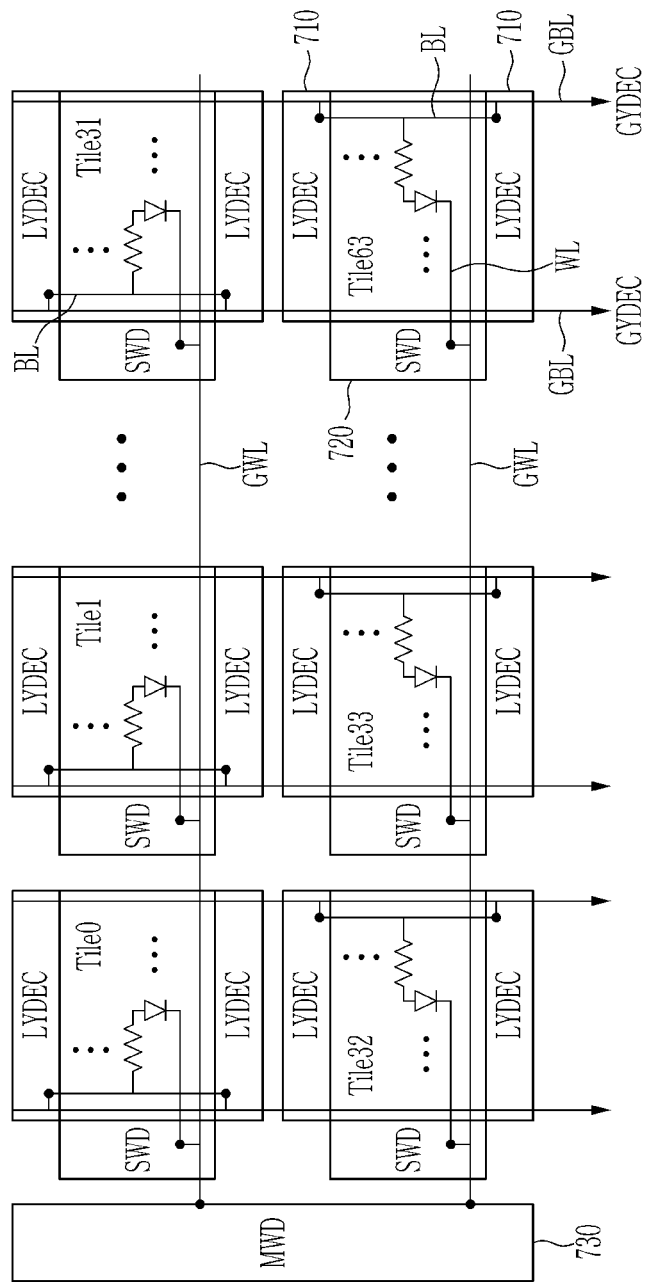
FIG. 7 schematically shows a half-partition in a PRAM module according to an embodiment of the present invention.

FIG. 6 shows an example of a partitioning scheme in a memory cell array of a PRAM module according to an embodiment of the present invention, and FIG. 7 schematically shows a half-partition in a PRAM module according to an embodiment of the present invention.

Referring to FIG. 6, in some embodiments, a memory cell array 510, for example, a PRAM bank may be partitioned into a plurality of partitions PART0 to PART15. It is shown in FIG. 6 that the memory cell array 510 is partitioned into sixteen partitions PART0 to PART15 by being divided into two parts in a row direction and into eight parts in a column direction. A plurality of row buffers 520 and 530 may be connected to the partitions PART0 to PART15. Each partition may be split into two parts (hereinafter referred to as "half partitions") to reduce parasitic resistances of bit lines and word lines and to address the sneak path issue. For example, each half-partition may perform 128-bit parallel I/O processing. In some embodiments, the partitions PART0 to PART15 may share a reading circuit such as a sense amplifier (550 of FIG. 5) and a row decoder (540 of FIG. 5).

Referring to FIG. 7, in some embodiments, each half-partition may include a plurality of sub-arrays which are referred to as tiles. It is shown in FIG. 7 that one half-partition includes 64 tiles Tile® to Tile63.

Each tile includes a plurality of memory cells, i.e., PRAM cores connected to a plurality of bit lines (e.g., 2048 bit lines) BL and a plurality of word lines (e.g., 4096 word lines) WL. For convenience, one memory cell among the plurality of memory cells, and one bit line BL and one word line WL connected to the one memory cell are shown in FIG. 7. Further, a phase change element and a switching element forming the memory cell are shown as a resister and a diode, respectively.

A local column decoder (hereinafter referred to as an "LYDEC") 710 may be connected to each tile. The LYDEC 710 is connected to the plurality of bit lines BL of a corresponding tile. In some embodiments, two LYDECs 710 may be connected to both ends of the corresponding tile, respectively. Further, a plurality of global bit lines GBL, which correspond to the plurality of tiles respectively, may be formed in the half-partition. Each global bit line GBL may be connected to the plurality of bit lines BL of the corresponding tile and to a global column decoder (hereinafter referred to as a "GYDEC"). In some embodiments, the LYDEC 710 together with the GYDEC may be used to select bit lines BL in the corresponding tile of the corresponding half-partition. A sense amplifier (550 of FIG. 5) may read data through the selected bit lines BL or a write driver (560 of FIG. 5) may write data through the selected bit lines BL.

A sub-word line driver (hereinafter referred to as an "SWD") 720 may be connected to each tile to maximize the degree of parallelism. A global word line GWL may be formed in the half-partition and may be connected to a main word line driver (hereinafter referred to as an "MWD") 730. In this case, a plurality of word lines WL formed in the half-partition may be connected to the global word line GWL. In some embodiments, as shown in FIG. 7, two global word lines GWL connected to the MWD 730 may be formed in the half-partition. This scheme is called a dual word line scheme. In this case, the plurality of tiles included in the half-partition may be grouped into two tile groups, and the two global word lines GWL may correspond to the two tile groups, respectively. All the SWDs within the half-partition are connected to a main word line driver (MWD). In addition, the two tiles may be grouped into a block by the dual word line scheme. In some embodiments, the SWD 720 together with the MWD 730 may be used to drive a word line WL in the corresponding tile. The driven word line WL may be selected by a row decoder (540 of FIG. 5).

When the PRAM module 500 uses the partitions shown in FIG. 6 and FIG. 7, the PRAM module 500 can simultaneously perform 64 I/O operations per half-partition. Consequently, since 128-bit parallel I/O operations can be performed per partition and the two partitions can be accessed in parallel in the partitions shown in FIG. 6 and FIG. 7, the PRAM module 500 can simultaneously manipulate 256-bit data. For this, sense amplifiers 550 and write drivers 560 may be located in front of the bank, which are connected to the row buffers.

Next, a PRAM-based accelerator according to an embodiment of the present invention is described with reference FIG. 8 to FIG. 13.

Figure 8:
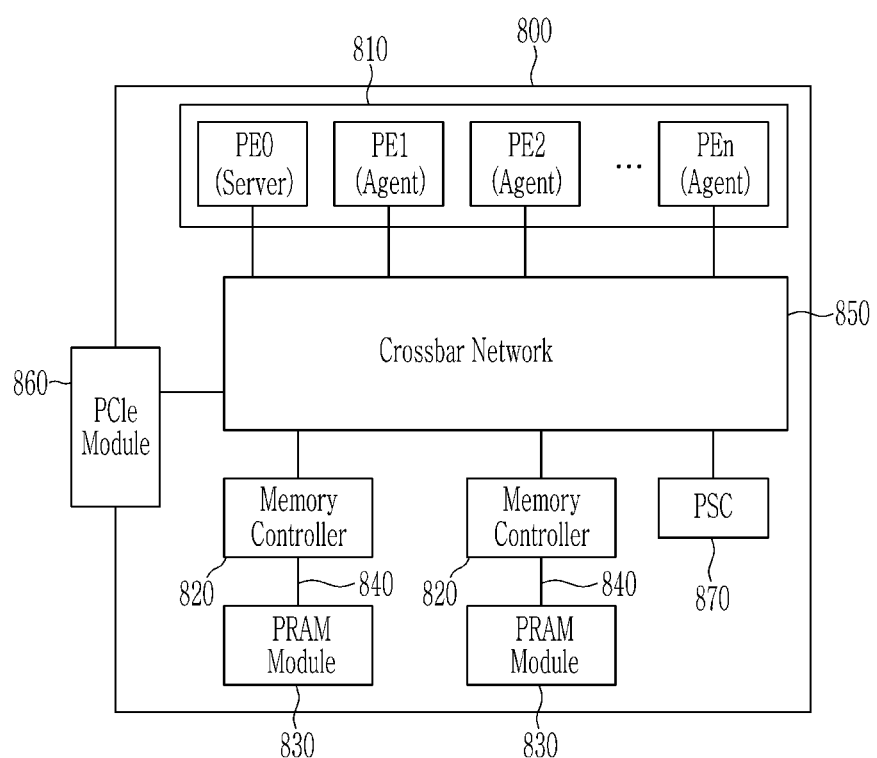
FIG. 8 is a schematic block diagram showing a PRAM-based accelerator according to an embodiment of the present invention.
Figure 9:
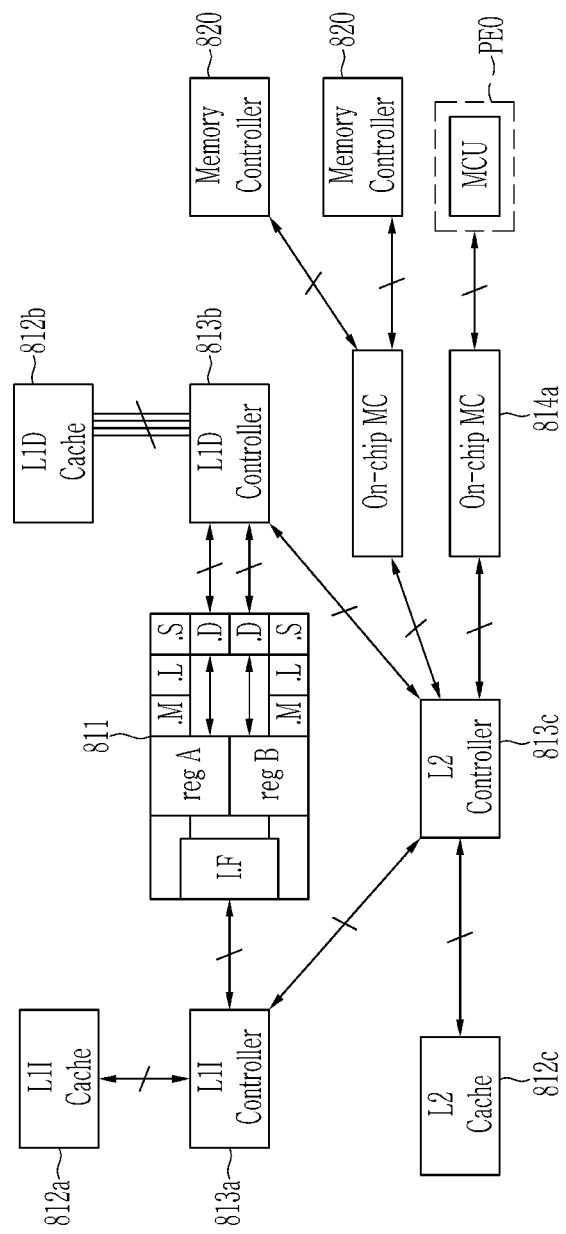
FIG. 9 is a schematic block diagram showing an agent in a PRAM-based accelerator according to an embodiment of the present invention.

FIG. 8 is a schematic block diagram showing a PRAM-based accelerator according to an embodiment of the present invention, and FIG. 9 is a schematic block diagram showing an agent in a PRAM-based accelerator according to an embodiment of the present invention.

Referring to FIG. 8, a PRAM-based accelerator 800 includes an accelerator core 810 and a PRAM subsystem, and the PRAM subsystem includes a memory controller 820 and a PRAM module 830.

The accelerator core 810 includes a plurality of processing elements PE0 to PEn, and each processing element includes a processing element core and a cache. In some embodiments, the cache may include an L1 cache (level 1 cache) and an L2 cache (level 2 cache), and the L1 cache may include an L1 instruction (L1I) cache and an L1 data (L1D) cache.

The processing elements PE0 to PEn may be classified into a server PE0 and agents PE1 to PEn according to their roles. Most processing elements PE1 to PEn are allocated to handle kernels provided by the host. These processing elements PE1 to PEn are referred to as agents. One or a few processing elements PE0 are allocated to resume and suspend kernel executions on the agents and are referred to as servers. The server PE0 may manage memory traffics requested by the agents PE1 to PEn.

In some embodiments, since the server PE0 manages the memory requests generated by the agents PE1 to PEn, the server PE0 may be implemented by a controller instead of the processing element used as the core.

In some embodiments, the server PE0 may include a memory controller unit (MCU) that takes over a cache miss, in particular an L2 cache miss, of the agent and administrates the associated PRAM accesses by collaborating with the memory controller 820.

In some embodiments, as shown in FIG. 9, the agent may include a processing element 811, a cache 812a, 812b, and 812c, a cache controller 813a, 813b, and 813c, and an on-chip memory controller 814a and 814b.

In one embodiment, the cache may include an L1I cache 812a, an L1D cache 812b, and an L2 cache 812c. In this case, the cache controller may include an L1I cache controller 813a, an L1D cache controller 813b, and an L2 cache controller 813c which are connected to the L1I cache 812a, the L1D cache 812b, and the L2 cache 812c, respectively. Each of the cache controllers 813a, 813b, and 813c may determine whether a request is a cache hit or cache miss in a corresponding one of the caches 812a, 812b, and 812c. The L1I cache 812a and the L1D cache 812b may be connected to the processing element 811 via the L1I cache controller 813a and the L1D cache controller 813b, respectively, and the L2 cache 812c may be connected to the processing element 811 via the L2 cache controller 813c connected to the L1D cache controller 813b. For example, the L1I cache controller 813a may be connected to the L1I cache 812a via a 128-bit bus, the L1D cache controller 813b may be connected to the L2 cache controller 813c via a 128-bit bus, and the L2 cache controller 813c may be connected to the L2 cache 812c via a 128-bit bus.

In some embodiments, the core 811 may include a plurality of functional units and general purpose registers. In one embodiment, the core 811 may include two sets of functional units and two general purpose registers regA and regB. For example, a set of functional units may include four functional units .M, .L, .S, and .D. The functional units .M, .L, .S, and .D and the registers regA and regB may be connected to the L1I cache 812a through an instruction fetch (IF) module. The functional unit .D may execute typical load and store (L/S) instructions related with memory operations. For example, the functional unit .D may load data from a memory to the registers regA and regB, or may store results from the registers regA and regB to the memory. The functional unit .M may perform multiplications, the functional units .S and .L may perform general sets of arithmetic, logical and branch function.

Further, the L1D cache controller 813b may be connected to the core 811, i.e., the two set of functional units via 64-bit buses, respectively, and may be connected to the L1D cache 812b via eight 32-bit buses in parallel.

In one embodiment, the on-chip memory controller may be connected to the cache controller, in particular, the L2 cache controller 813c. The on-chip memory controller may include on-chip memory controllers 814a and 814b which are connected to the server PE0 and the memory controller 820, respectively. For example, the on-chip memory controller 814a may be connected to the L2 cache controller 813c via a 256-bit bus and connected to the server PE0 via a 256-bit bus. The on-chip memory controller 814b may be connected to the L2 cache controller 813c via a 256-bit bus and connected to the two memory controllers 820 via 128-bit buses, respectively.

In some embodiments, the on-chip memory controllers 814a and 814b may be direct memory access (DMA) controllers.

In one embodiment, the L2 cache controller 813c may generate a memory request through the on-chip memory controller 814a when the cache miss occurs in the L2 cache 812c. The memory request may be transferred to the server PE0 via the on-chip memory controller 814a. Data which the memory controller 820 reads from the PRAM module 830 in accordance with the memory request may be stored to the L2 cache 812c via the on-chip memory controller 814b and the L2 cache controller 813c. As such, the memory requests generated by the on-chip memory controller 814a are issued to the PRAM subsystem 820 and 830 through the server PE0, in particular the MCU of the server PE0, while the target data can be directly forwarded to the on-chip memory controller 814b connected to the L2 cache of each agent.

While it is shown in FIG. 8 that one of the processing elements PE0 to PEn is allocated to the server and remaining processing elements PE1 to PEn are allocated to the agents, two or more processing elements may be allocated the servers.

In some embodiments, each of the processing elements PE1 to PEn may include an MCU instead of providing a processing element PE0 as the server. In this case, each MCU may manage a memory request of a corresponding processing element.

The memory controller 820 is connected to the PRAM module 830 via a channel (which may be called a bus) 840. The memory controller 820 receives a memory request from the server and transfers the memory request to the PRAM module 830 through the channel 840. Therefore, the memory controller 820 can transfers memory read/write commands and addresses to and exchange data with the PRAM module 830 through the channel 840.

In some embodiments, the PRAM module 830 may employ an NVM interface. In one embodiment, the NVM interface may be a DDR interface, for example, a LPDDR2-NVM interface. In a case that the PRAM module 830 employs the DDR interface, the channel 840 may be a DDR channel, for example, an LPDDR channel In some embodiments, a plurality of PRAM banks, for example, sixteen PRAM banks may be commonly connected to one channel 840.

In some embodiments, a plurality of memory controllers 820 may be provided. It is shown in FIG. 8 and FIG. 9 that two memory controllers 820 are provided. In this case, the plurality of memory controllers 820 are connected to different channels 840, respectively.

The PRAM-based accelerator 800 may further include a network 850 for connecting the processing elements PE0 to PEn with the memory controller 820 to integrate the processing elements PE0 to PEn, the memory controller 820, and the PRAM module 830. In some embodiments, the network 850 may be a crossbar network for p:q communications (p and q are integers more than one).

In some embodiments, the PRAM-based accelerator 800 may further include an interface module 860 that is used for communicating with the host. The interface module 860 may be, for example, a PCIe module for a PCIe interface. The host can communicate with the accelerator core 810, particularly, the server PE0 of the accelerator core 810 and the memory controller 820 through the interface module 860. For the communication, the interface module 860 is also connected to the network 850.

In some embodiments, the PRAM-based accelerator 800 may further include a power sleep controller (PSC) 870. The PSC 870 may control a mode of each of the agents PE1 to PEn in accordance with a control of the server PE0. The server PE0 may put each of the agents PE1 to PEn in a sleep mode (which may be called an idle mode) or revoke each of the agents PE1 to PEn, using the PSC 870. Accordingly, the server PE0 can suspend or resume the kernel execution in each of the agents PE1 to PEn.

In some embodiments, each of the processing elements PE0 to PEn may be connected to the network 850 via a master port and a slave port, and the memory controller 820 may be connected to the network 850 via a master port and a slave port. In one embodiment, the interface module 860 may be connected to the network 850 via a master port and a slave port such that the host can communicate with the server PE0 and the memory controller 820. The PSC 870 may be connected to the network 850 via a master port and a slave port.

According to the above embodiments, the server PE0 can take over cache misses of each of the agents PE1-PEn via the network 850 and then administrate associated PRAM accesses by collaborating with the memory controller 820. The server PE0 may send a memory read or write message to the memory controller 820 through a bus, and then, the memory controller 820 may manage transactions upon the PRAM module 830.

In some embodiment, in a case that the PRAM module 830 employs the DDR interface, for example the LPDDR2-NVM interface, the memory controller 820 may convert requests of the server PE0 to LPDDR2-NVM transactions. For this, the memory controller 820 may perform three-phase addressing.

A memory address, i.e., a row address to be transferred from the memory controller 820 to the PRAM module 830 may be divided into an upper address and a lower address. For example, when the row address uses (n+1) bits, the upper address may use upper (n−m+1) bits (a[n:m]) and the lower address may use lower (m−x) bits (a[m−1:x]) (n, m, and x are integers more than zero).

Figure 10:
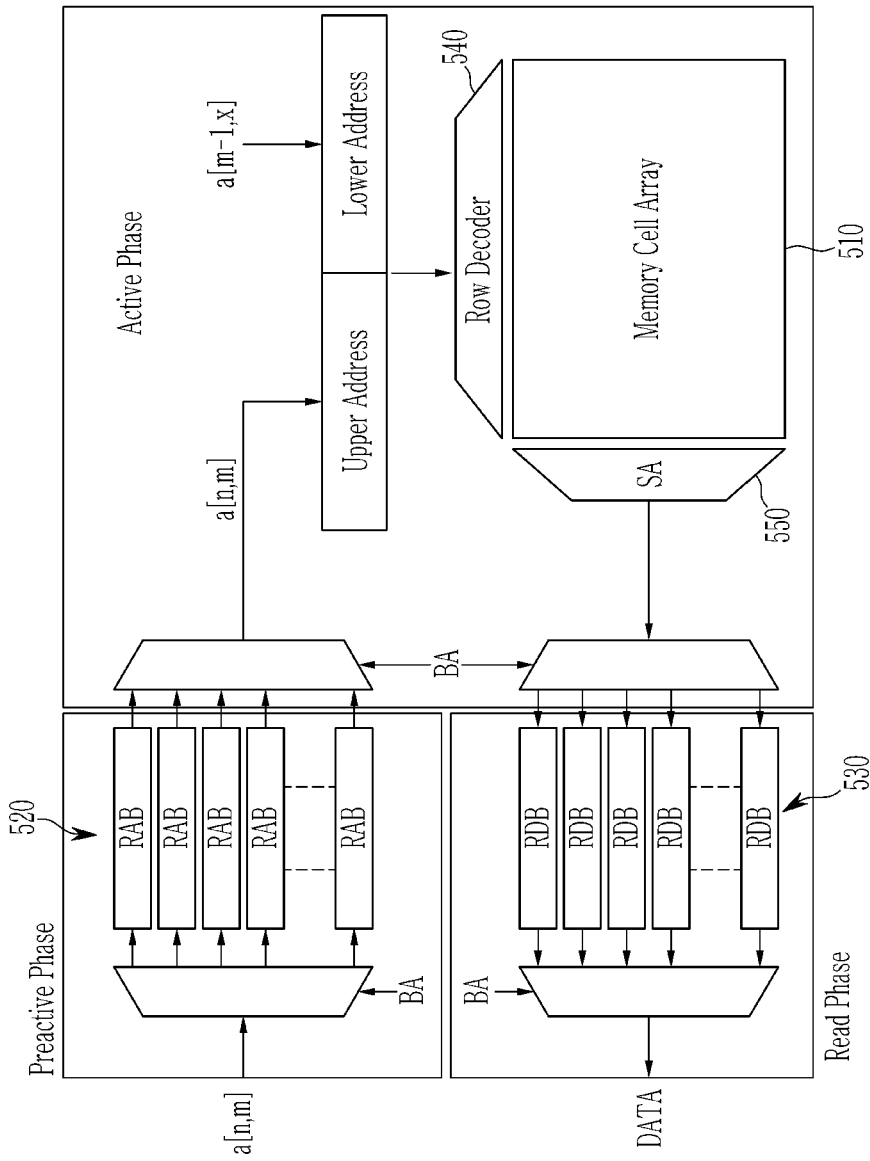
FIG. 10 shows three-phase addressing in a PRAM-based accelerator according to an embodiment of the present invention.

FIG. 10 shows three-phase addressing in a PRAM-based accelerator according to an embodiment of the present invention.

Referring to FIG. 10, in a preactive phase that is the first phase in the three-phase addressing, the memory controller (820 of FIG. 8) selects a row address buffer (RAB) 520 by sending a buffer address (BA) selection signal and stores an upper address (a[n,m]) of a row address associated with a target row into a target RAB 520.

In an active phase that is the second phase, the memory controller 820 sends a remaining part of the row address, i.e., a lower address (a[m−1,x]) to a target PRAM module (830 of FIG. 8). The lower address (a[m−1,x]) delivered to the PRAM module 830 can be merged with the upper address (a[n,m]) retrieved from the selected RAB 520 to compose the actual row address. Accordingly, the target PRAM module 830 loads target row data from a memory cell array 510 and stores them to a row data buffer (RDB) 530, i.e., the RDB 530 associated with the selected RAB 520. For example, the RPAM module 830 may deliver the row address to a target row decoder (540 of FIG. 5), and the row decoder 540 may select the target row from the memory cell array 510 using the row address. A sense amplifier 550 may transfer the target data from the target row to the target RDB 530.

After the active phase, a specific data location (i.e., a column address) within the selected RDB 530 may be delivered by read/write phase commands. For example, if the command is a read, in a read phase that is the last phase, the memory controller 820 selects the target RDB 530 using the buffer address BA and selects a start address of read data using a column address. Accordingly, the memory controller 820 can read and output the target data stored in the RDB 530. The target data may be available to pull out from the designated RDB 530 at every falling and raising edges of an interface clock signal.

As such, the memory controller 820 delivers the row address to the PRAM module 830 by dividing the row address into the upper address and the lower address such that the PRAM-based accelerator can be implemented using the DDR interface, particularly, the LPDDR2-NVM interface.

In some embodiments, if the upper address of the target row already exists in the RABs 520, the memory controller 820 may skip the preactive phase and directly enable the active phase. In some embodiments, if data of the target row are ready on the RDBs 530, the memory controller 830 may skip the active phase.

For example, if the command is a write, the memory controller 820 may transfer target data to a special set of registers and a buffer provided by the target PRAM module 830. The register set and the buffer may be overlay window registers (570 of FIG. 5) and a program buffer (580 of FIG. 5). For example, the row decoder 540 may deliver the merged row address of the upper address and the lower address to the overlay window registers 570. Then, the target data can be stored in the program buffer 580 through the overlay window registers 570. Accordingly, a server PE0 or a host can recognize that the target data are written to the PRAM module 830 such that the issue that the write operation is slower than the read operation can be solved. Further, since the data stored in the program buffer 580 are programmed to the memory cell array 510, the memory controller 820 can determine whether the write operation to the memory cell array 510 is actually completed by polling the overlay window registers 570.

As such, since the PRAM-based accelerator performs the write operation using the overlay window registers 570 and the program buffer 580, the issue that the write operation is slower than the read operation in the PRAM module can be solved.

In some embodiments, to reduce the number of accesses to the PRAM module 830, the server PE0 may initiate a memory request based on predetermined bytes per channel (e.g., 512 bytes per channel (32 bytes per bank)) by leveraging its L2 cache, and prefetch data by using all RDBs 530 across different banks.

Figure 11:
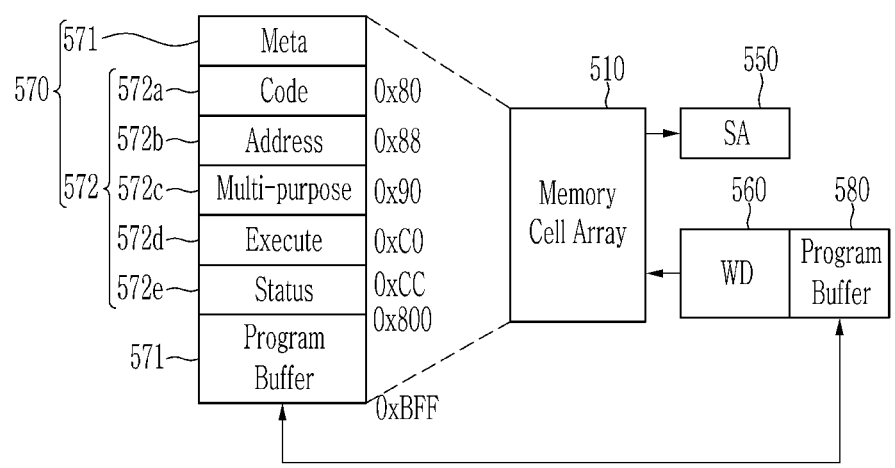
FIG. 11 shows an overlay window of a PRAM-based accelerator according to an embodiment of the present invention.

FIG. 11 shows an overlay window of a PRAM-based accelerator according to an embodiment of the present invention.

Referring to FIG. 11, in some embodiments, an overlay window, i.e., overlay window registers 570 and a program buffer 580 are mapped to an address space of a memory cell array as a set of special memory-mapped registers. The overlay window registers 570 include meta-information 571 and a set of control registers 572 as the set of memory-mapped registers. The meta-information 571 may include an overlay window size, a device ID, a program buffer offset, and a program buffer size, and have, for example, 128 bytes. The set of control registers 572 may include various registers, for example, a command code register 572a, an address register 572b, a multi-purpose register 572c, an execution register 572d, and a status register 572e.

In some embodiments, addresses of program buffer 580 may be mapped to a predetermined location of an overlay window space, for example, an end of the overlay window space. In one embodiment, the program buffer 580 may be located in front of partitions with a write driver 560. In one embodiment, the program buffer 580, as a part of the overlay window, may begin after the meta-information 571 and control registers 572.

The overlay window 570 and 580 may have an address range which can be mapped to an address space of the memory cell array 510. For example, the address range of the overlay window 570 and 580 may be mapped to the address space of the memory cell array 510 through an overlay window base address (OWBA). Thus, after configuring the OWBA, a memory controller can write data into the program buffer 580 through three-phase addressing.

Whenever a host requires to persistently program data to a PRAM module, the memory controller may initiate the program by updating the command and execute the overlay window registers 570. Then, the PRAM module may automatically fetch the data from the program buffer 580 and store the data into the designated partition based on a row address, which is stored into the address register 572b of the overlay window. Once the program is begun, the memory controller may check the progress of the target partition via the status register 572e in the overlay window. These memory operations over the overlay window can be useful if there is a high data locality and long request interval since the overlay window can be in parallel mapped to other addresses while programming the data to the target partition.

The register manipulations for the overlay window 570 and 580 may be performed by obeying the three-phase addressing interface. Therefore, the memory controller may appropriately translate an incoming request to three-phasing addressing operations. Row buffers may be connected to the partitions of the target memory cell array through sense amplifiers 550, but separated from the overlay window 570 and 580.

Figure 12:
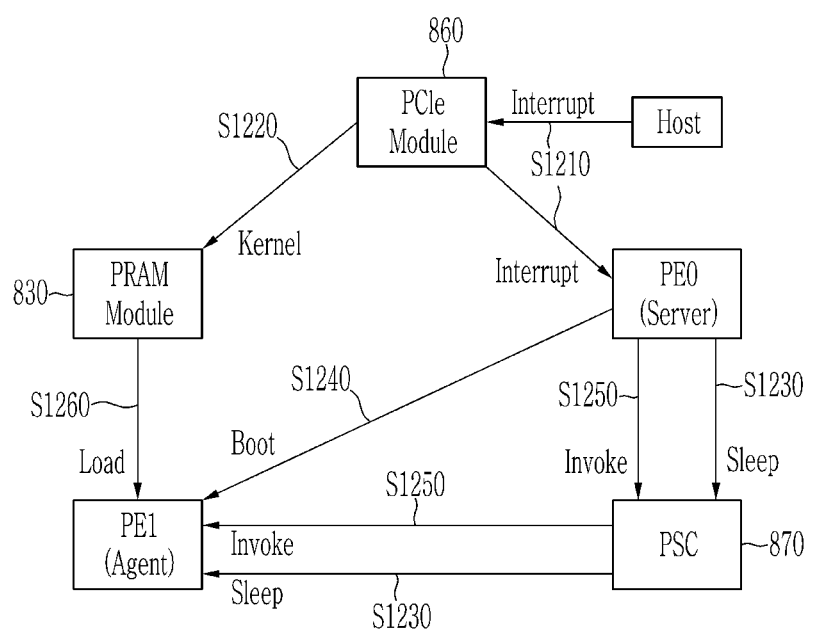
FIG. 12 and FIG. 13 show operations of a PRAM-based accelerator according to an embodiment of the present invention.
Figure 13:
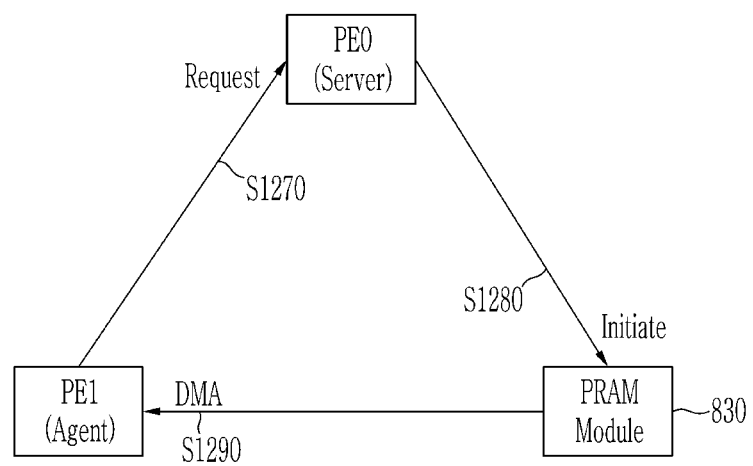
Figure 14:
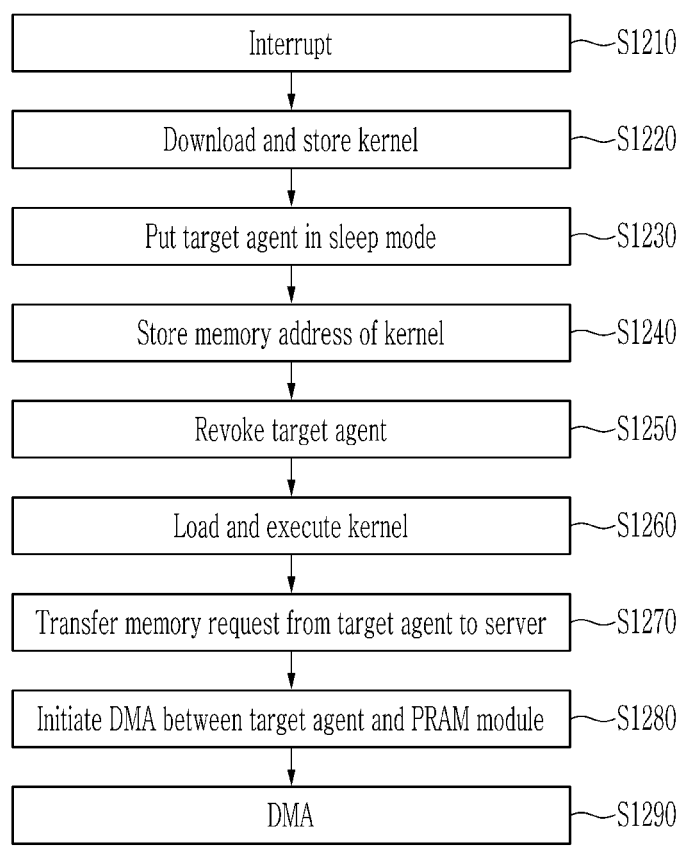
FIG. 14 is a flowchart showing data movement method of a PRAM-based accelerator according to an embodiment of the present invention.

FIG. 12 and FIG. 13 show operations of a PRAM-based accelerator according to an embodiment of the present invention, and FIG. 14 is a flowchart showing data movement method of a PRAM-based accelerator according to an embodiment of the present invention.

Referring to FIG. 12 and FIG. 14, a host issues an interrupt, for example, a PCIe interrupt to a PRAM-based accelerator. Accordingly, the interrupt from the host is forwarded from an interface module 860 to a server PE0 within the PRAM-based accelerator (S1210). Then, the memory controller 820 downloads data including a kernel through the interface module 860 from a host-side memory and stores the data to a PRAM module 830 (S1220). In some embodiments, the data may be downloaded into a designated image space of the PRAM module 830.

Once the download has been performed, the server PE0 stores, as a boot address, a memory address (i.e., an image address of the PRAM module 830) of the kernel to be executed to a cache of a target agent PE1 among a plurality of agents (S1240). In some embodiments, the cache for storing the memory address may be an L2 cache. In some embodiments, before storing the memory address of the kernel, the server PE0 may put the target agent PE1 in a sleep mode using a PSC 870 (S1230).

Once the memory address of the kernel is stored, the target agent PE1 loads the kernel from the PRAM module 830 based on the memory address stored in the cache and executes the kernel (S1260) since the memory address is stored in the cache as the boot address. In some embodiments, the server PE0 may revoke the target agent PE1 of the sleep mode via the PSC 870 (S1250). Then, as the target agent PE1 awakes, it may load the kernel from the PRAM module 830 based on the memory address stored in the cache and execute the kernel (S1260).

Referring to FIG. 13 and FIG. 14, during the kernel execution, if data requested by the agent PE1 hits the cache, for example, the L2 cache, the agent PE1 can use the data stored in the cache. However, in case of a cache miss, the agent PE1 issues a memory request generated by the cache miss to the server PE0, i.e., an MCU of the server PE0 (S1270). The server PE0 then moves data between the agent PE1 and a row data buffer (530 of FIG. 5) or an overlay window (570 and 580 of FIG. 5) of the PRAM module 830 through a memory controller (820 of FIG. 8) (S1280 and S1290). In some embodiments, the server PE0 may initiate DMA between the agent PE1 and the row data buffer 530 or the overlay window 570 and 580 of the PRAM module 830 through the memory controller 820 (S1280) such that the data can move between the agent PE1 and the PRAM module 830 (S1290).

In one embodiment, the server PE0 transfers the memory request to the memory controller 820 of the PRAM module 830 (S1280). In some embodiments, the memory controller 820 may transfer a row address for accessing the PRAM module 830 to the PRAM module 830 by dividing the row address into an upper address and a lower address, in accordance with the memory request. The memory controller 820 sends a response with data corresponding to the memory request to the agent PE1 (S1290). The memory controller 820 may move the data from a target row of a memory cell array (510 of FIG. 5), which is selected by a row address buffer (520 of FIG. 5) of the PRAM module 830, to a row data buffer (530 of FIG. 5) in accordance with the memory request, and transfer the data moved to the row data buffer 530 to the agent PE1. In this case, if the data are ready on the row data buffer 530, the memory controller 820 may skip moving the data from the memory cell array 510 to the row data buffer 520. For example, the memory controller 820 may upload the data, which are read from the PRAM module 830, to the L2 cache of the agent PE1. As such, the PRAM-based accelerator can store the data to the L2 cache of the agent PE1 using the row buffer 520 and 530 of the PRAM module 830, without an assistance of a main memory (120 of FIG. 1) or other memories of the computing device.

Further, the agent PE1 may issue a memory request for requesting to write data to the PRAM module 830 to the server PE0 (S1270). Then, the server PE0 may transfer the memory request to the memory controller 820 of the PRAM module 830 (S1280), and the memory controller 820 may write the data corresponding to the memory request from the agent PE1 to the PRAM module 830 and send a response to the agent PE1 (S1290). That is, the memory controller 820 may determine a target row address using the row address buffer 520 and store the write data of the agent PE1 to a program buffer 580 of the PRAM module 830 in accordance with the memory request, and write the data stored in the program buffer 580 to the target row of the memory cell array 510. For example, the memory controller 820 may fetch the data from the L2 cache of the agent and write the data to the PRAM module 830. As such, the PRAM-based accelerator can load the data from the L2 cache of the agent PE1 and write the data to the PRAM module 830 using the row address buffer 520 of the PRAM module 830, without an assistance of the main memory 120 or other memories of the computing device.

Accordingly, the server PE0 can transfer the data between the agent PE1 and the row data buffer 530 or program buffer 580 of the PRAM module 830 through the memory controller 820. As such, each processing element can directly access a storage core within the PRAM-based accelerator, i.e., the PRAM module 830, through the existing load/store instructions. That is, the PRAM module accesses can be done without any modification of the existing instruction set architecture and without an assistance of an operating system (OS) of the computing device. Therefore, data movements between the host's storage device and the accelerator can be removed.

Figure 15:
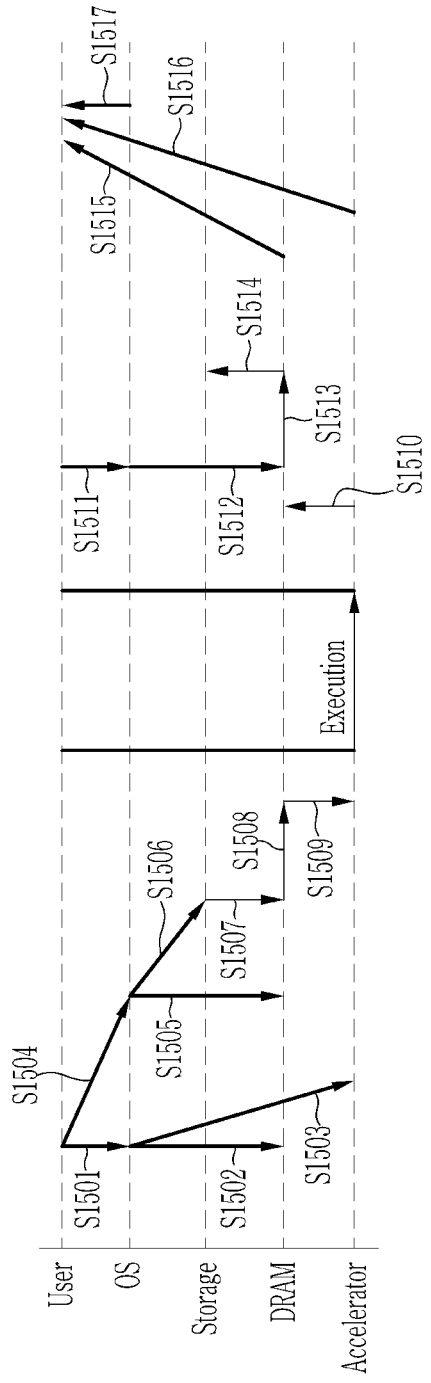
FIG. 15 shows data movements on an accelerator of a conventional computing device.
Figure 16:
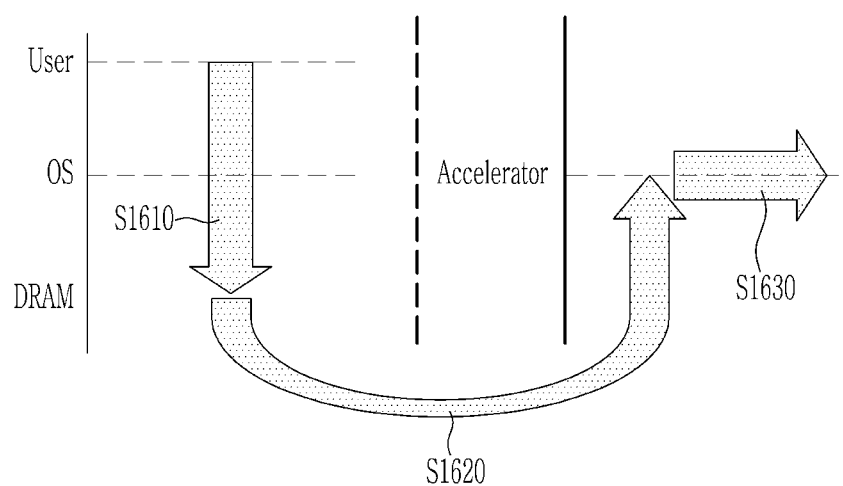
FIG. 16 shows data movements on a PRAM-based accelerator of a computing device according to an embodiment of the present invention.

FIG. 15 shows data movements on an accelerator of a conventional computing device, and FIG. 16 shows data movements on a PRAM-based accelerator of a computing device according to an embodiment of the present invention.

Referring to FIG. 15, an application creates a file descriptor for a read and/or a write through an OS in response to a user's application execution (S1501). Then, a virtual memory is allocated to a system memory, for example, a DRAM for reading data from a storage device or writing data to the storage device (S1502). Further, an accelerator's memory is allocated for writing data to the accelerator or reading data from the accelerator (S1503).

The application then requests a file read for the storage device through the OS (S1504), and a physical memory is allocated to the DRAM (S1505). File data are requested for the storage device through the OS (S1506). Then, the file data are transferred from the storage device to the physical memory of the DRAM and are copied from the physical memory of the DRAM to the virtual memory (S1507 and S1508). The application then transfers the file data from the DRAM to the accelerator's memory (S1509). Consequently, the accelerator processes the file data. Next, result data of the file data are transferred from the accelerator's memory to the virtual memory of the DRAM (S1510).

The application then requests a file write for the storage device (S1511). A physical memory is allocated to the DRAM such that the result data are copied from the virtual memory to the physical memory of the DRAM (S1512 and S1513) and are transferred from the physical memory of the DRAM to the storage device (S1514).

Next, the application releases the virtual memory of the DRAM allocated for the read and/or write (S1515), and releases the accelerator's memory allocated for the write and/or read (S1516). Further, the application deletes the file descriptor created for the read and/or write (S1517).

In FIG. 15, the steps S1501 to S1506, S1511, S1512, and S1515 to S1517 represent system operations, and the steps S1507 to S1510, S1513, and S1514 represent data movements.

As described above, the conventional computing device is required to create the file descriptor and allocate multiple memory spaces which reside in the host-side memory (DRAM) and in the accelerator's memory. Then, inputs/outputs for the storage device and the data movements between the host-side memory and the accelerator's memory can be performed. In this case, the CPU is frequently required to intervene in data transfers between multiple user software and kernel modules, which are involved in both the accelerator and storage stacks. These interventions introduce user/kernel mode switching and redundant data copies, which waste a large number of cycles in moving the data between the storage device and the accelerator. However, from the viewpoint of the user, the CPU does not need to access the input (or output) data at all, which is mostly used in the target accelerator.

In contrast, according to an embodiment of the present invention, as shown in FIG. 16, a kernel is generated by the user and is stored in a system memory, for example a DRAM (S1610). The kernel is transferred from the DRAM to a PRAM-based accelerator (S1620), and tasks of the kernel are executed and completed within the PRAM-based accelerator (S1630).

As such, the PRAM-based accelerator according to an embodiment of the present invention unifies computational resources and storage resources, and therefore, the user can compose a kernel on the host and simply transfer the kernel to the target accelerator for execution. Accordingly, unnecessary host-side software interventions and memory copies among the CPU, the storage device, and the accelerator can be eliminated. Further, the kernel can be executed without an assistance of the DRAM.

Figure 17:
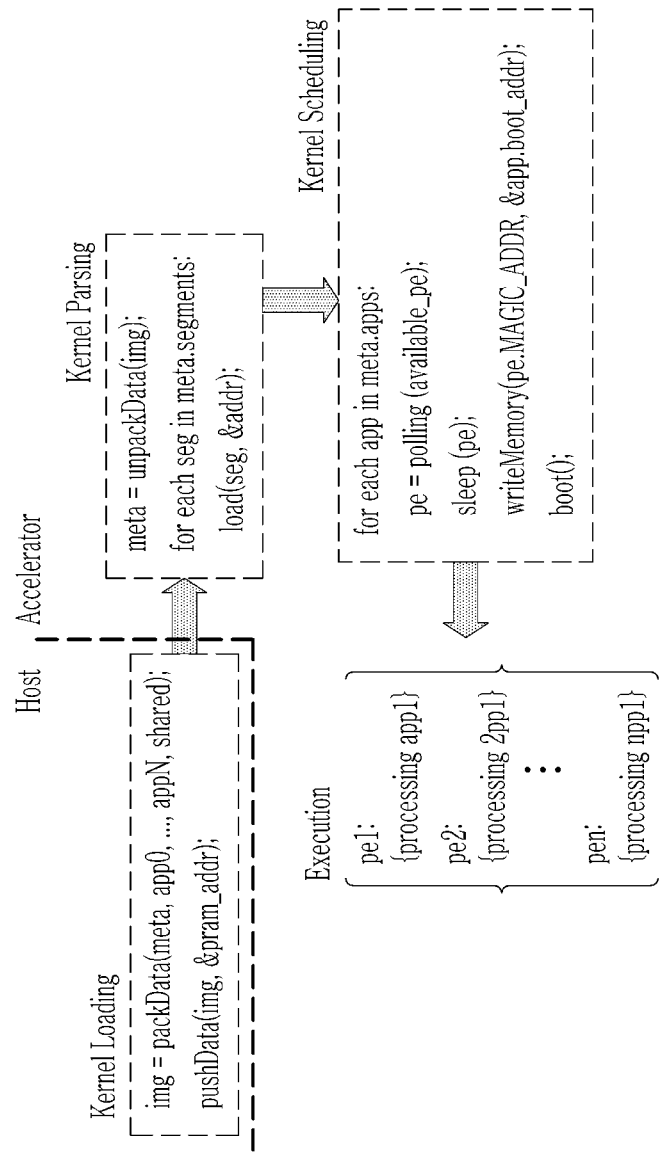
FIG. 17 shows a programming model on a PRAM-based accelerator according to an embodiment of the present invention.

FIG. 17 shows a programming model on a PRAM-based accelerator according to an embodiment of the present invention.

Referring to FIG. 17, a user packs kernels via a packData interface [packData( )] and offloads the kernels to a PRAM-based accelerator via a pushData interface [pushData( )]. Parameters of the packData interface [pushData( )] may include metadata (meta), which defines the accelerator's memory address to download code segments for a plurality of applications (app0, app1, appN) and shared common codes (shared). The pushData interface packs the kernels to return a kernel image. Parameters of the pushData interface [pushData( )] may include a pointer, which refers to the host's memory address of the kernel image (img) and the accelerator's memory address (&pram_addr) to download. Once the kernel image arrives in the accelerator's memory, a server may start to extract metadata information from the kernel image via the unpackData interface [unpackData (img)] and load the code segments to the target addresses described in the metadata [load( )]. Parameters of the load interface [load( )] may include each code segment (seg) and the target address (&addr).

After parsing the kernel image, the server may start to check each agent for availability via a polling interface [polling( )]. A parameter of the polling interface [polling( )] may include an available agent (available_pe) and return an agent in idle. If one agent is in idle, the server may put this agent in a sleep mode (i.e., power off this agent) via a sleep interface [sleep(pe)], assign a kernel to the agent via a writeMemory interface [writeMemory( )], and revoke (i.e., reboot) the agent via a boot interface [boot( )]. The writeMemory interface [writeMemory( )] may include, as parameters, a magic address (MAGIC_ADDR) and a boot entry address (&app.boot_addr) to update the agent's magic address (i.e., boot address) with the kernel's boot entry address (i.e., the address to which the kernel is stored). Accordingly, each agent (pei) can keep continuing the execution of the kernel until completing the data processing (processing appi).

Next, read and write timings in a PRAM-based accelerator according to an embodiment of the present invention are described with reference to FIG. 18 and FIG. 19.

Figure 18:
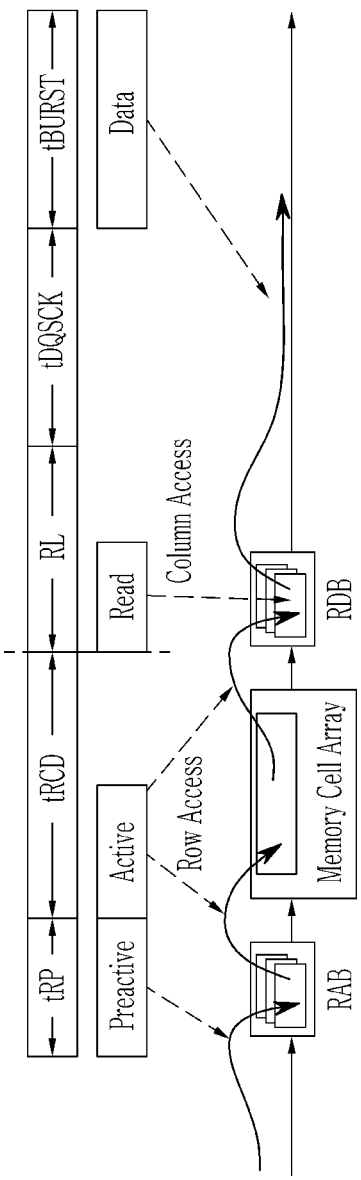
FIG. 18 shows a read timing in a PRAM-based accelerator according to an embodiment of the present invention.
Figure 19:
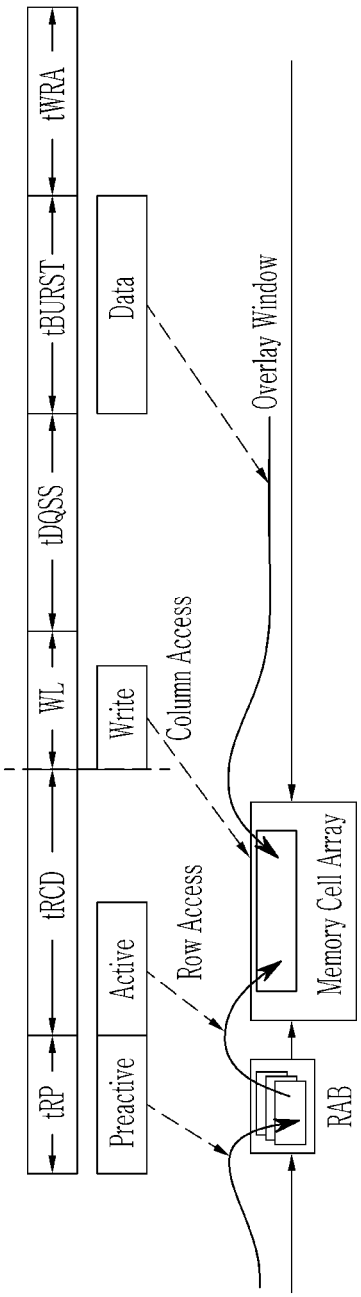
FIG. 19 shows a write timing in a PRAM-based accelerator according to an embodiment of the present invention.

FIG. 18 shows a read timing in a PRAM-based accelerator according to an embodiment of the present invention, and FIG. 19 shows a write timing in a PRAM-based accelerator according to an embodiment of the present invention.

As described with reference to FIG. 10, row accesses for read and write may be performed in preactive and active phases in three-phase addressing. Referring to FIG. 18 and FIG. 19, a PRAM-based accelerator handles a target row address buffer (RAB) to store an upper address within a preactive time tRP of the preactive phase. The tRP time may be similar to a row precharge time of a DDR interface used in a conventional DRAM.

An activate time tRCD of the active phase can be classified by a row address to column address delay, which may include an address composition time for target row location (by combining a value stored in the target RAB and a lower address) and a memory operation time. In a case of a write command, a target PRAM module may check whether the composed row address is within an address range of an overlay window or not in the tRCD time. If the target row address is matched with the address of the overlay window, target data associated with the target row address may be processed by a set of registers of the overlay window and stored into a program buffer. Otherwise, the target data may be referred to by a designated memory cell array. In a case of a read command, the tRCD time may further include a time to fetch row data from a target row to a target row data buffer (RDB).

Referring to FIG. 18, in a read phase, a read preamble period that includes a read latency clock (RL) and a data strobe signal (DQS) output access time, i.e., a DQS access time from clock (tDQSCK) is consumed. The data are then delivered out from the RDB by referring to a column address, which is embedded in a read phase command, during a data burst time (tBURST).

Referring to FIG. 19, in a write phase, a memory timing for a write phase command is similar to that for the read phase command. Particularly, the write phase command exhibits a write latency clock (WL) in a write preamble period instead of the RL, and exhibits a DQS latching transition to clock edge (tDQSS) in the write preamble period instead of the tDQSCK. The data are then programmed from a program buffer of the overlay window RDB to the designated memory cell array by referring to a column address, which is embedded in the write phase command, during a data burst time (tBURST). A program time sequence of the write phase may further include a write recovery period (tWR), which is a time to guarantee that all the data in the program buffer are completely programmed to the target memory cell array.

In some embodiments, memory requests for different partitions in the same PRAM module may be interleaved. Such embodiments are described with reference to FIG. 20 and FIG. 21.

Figure 20:
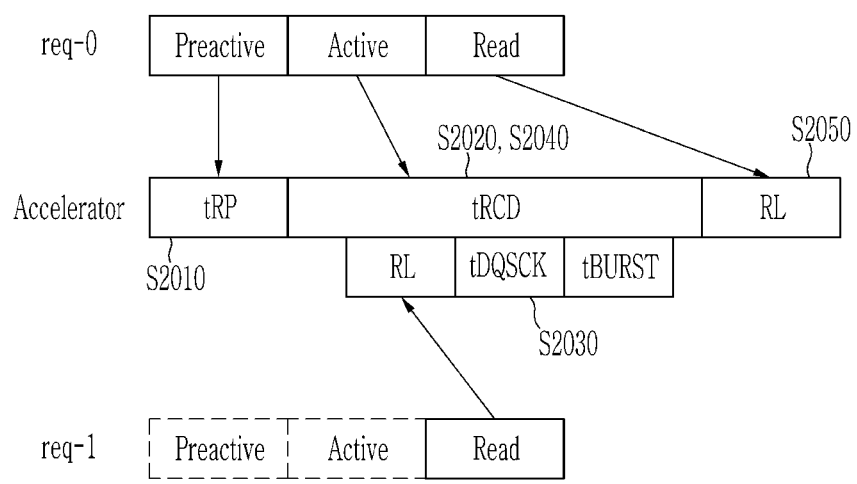
FIG. 20 and FIG. 21 show memory request interleaving in a PRAM-based accelerator according to an embodiment of the present invention.
Figure 21:
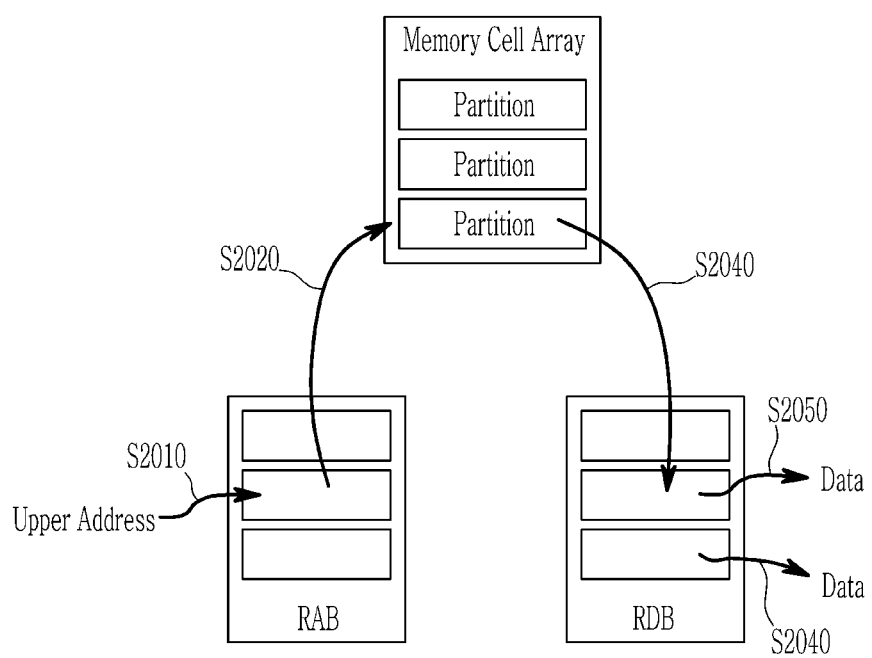

FIG. 20 and FIG. 21 show memory request interleaving in a PRAM-based accelerator according to an embodiment of the present invention.

For convenience, it is described in FIG. 20 and FIG. 21 that two read memory requests req-0 and req-1 are processed in parallel. In this case, the two memory requests req-0 and req-1 target to different partitions in the same PRAM module.

In some embodiments, to reduce latency of data movements between a PRAM module (830 of FIG. 8) and L2 caches of target agents (PE1 of FIG. 8), a memory controller (820 of FIG. 8) may schedule memory requests by being aware of multiple partitions and row buffers of the PRAM module 830. The PRAM module 830 can sense data out from a partition to a row data buffer (RDB) (530 of FIG. 5), while transferring data out from other RDB 530 to a target cache, in parallel. Thus, a time to transfer the data can be overlapped with the latency to access the partition.

Referring to FIG. 20 and FIG. 21, the memory controller 820 issues a preactive command of the memory request req-0 (S2010). It is assumed that pre-active and active commands of the memory request req-1 have been initiated just before the preactive command of the memory request req-0 is issued. While it takes a preactive time tRP and an active time tRCD related to the memory request req-0 (S2010, S2020, and S2040), the memory controller 820 sends a read phase command for a different target partition with a different RDB address (S2030). In other words, while the memory controller 820 accesses a partition and brings data from the partition to a target RDB (S2020 and S2040) after storing an upper address to a target row address buffer (RAB) (S2010), the memory controller 820 sends the read phase command for the different target partition in parallel (S2030). Since the RDB associated with the memory request req-1 is ready to transfer the data, during the tRCD time of the memory request req-0 (S2020 and S2040), the memory controller 820 can bring the data of the memory request req-1 from the RDB and place them on a target L2 cache (S2030). In other words, an RL time, a tDQSCK time, and a tBURST time of the memory request req-1 can be sequentially consumed (S2030). Once all the data of the memory request req-1 have been transferred, read phase operations (RL, tDQSCK, and tBURST) of the memory request req-0 while the memory controller 820 is accessing another partition (S2050). In this way, the memory controller can make the data transfers invisible to the agent PE1.

As described above, since the memory requests req-0 and req-1 can be processed in parallel, the latency to access the memory can be reduced. On the other hand, the interleaving described with reference to FIG. 20 and FIG. 21 may be different with bank interleaving in the sense that all the memory requests are interleaved within a single PRAM module (e.g., a single PRAM bank).

In some embodiments, a PRAM-based accelerator may perform selectional erasing to reduce an overwrite overhead. Such embodiments are described with reference to FIG. 22.

Figure 22:
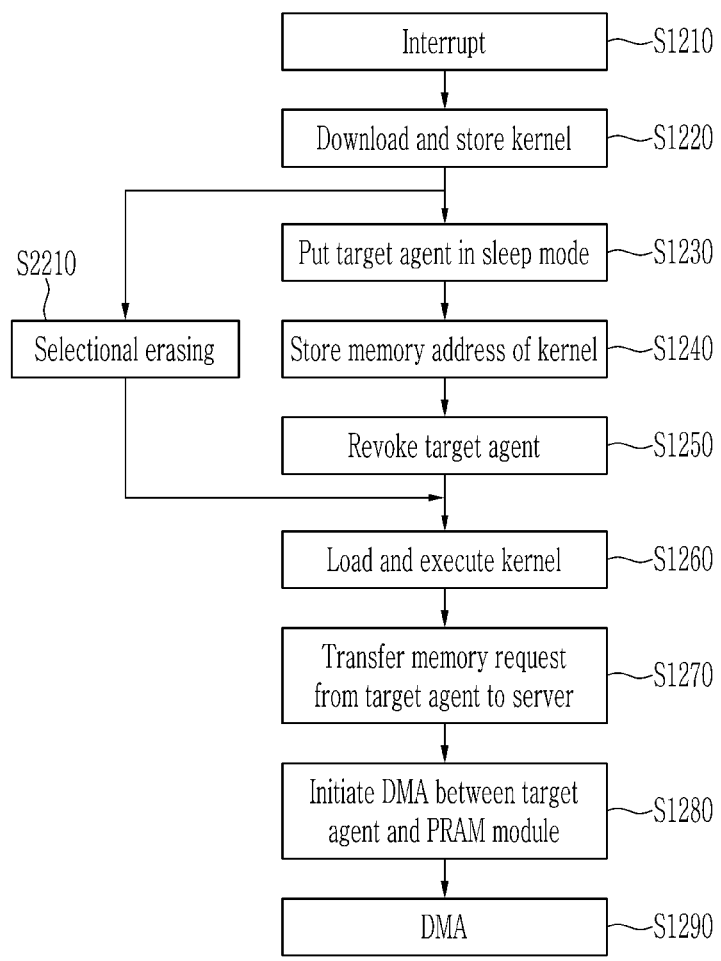
FIG. 22 shows selectional erasing in a PRAM-based accelerator according to an embodiment of the present invention.

FIG. 22 shows selectional erasing in a PRAM-based accelerator according to an embodiment of the present invention.

Similar to other NVM technologies (e.g., flash), the PRAM may also support an erase operation that performs pre-reset on a target block, which can remove reset operations from an overwrite. In a case that the conventional erase operation is performed in a PRAM module, the latency due to the erase operation may be longer than the latency of the overwrite which does not use the erase operation. This long latency of the erase operation can block all coming requests.

Accordingly, in some embodiments, a PRAM-based accelerator uses selectional erasing. Since a reset operation is a process to simply toggle target cells from a programmed status to a pristine state, a PRAM subsystem may selectively program data for setting a reset status (e.g., data of "0") for only addresses that will be overwritten. In one embodiment, a memory controller (820 of FIG. 8) of the PRAM subsystem may selectively program only addresses that will be overwritten while a target kernel is loaded. In this case, the memory controller 820 may selectively program only addresses that will be overwritten while a target kernel is loaded, before execution of the target kernel is completed.

In one embodiment, referring to FIG. 22, while a server PE0 puts a target agent PE1 in a sleep mode (S1230), stores a memory address of a kernel to be executed to a cache of the target agent PE1 (S1240), and revokes the target agent PE1 of the sleep mode (S1250), the memory controller 820 may perform selectional erasing by selectively programming the data for setting the reset status for only addresses to be overwritten by execution of the kernel (S2210). In this case, the addresses to be accessed (i.e., overwritten) by the execution of the kernel may be provided by a host when the kernel is downloaded.

As a result of implementing the selectional erasing and testing it on the PRAM module, it is confirmed that the selectional erasing can reduce the overwrite latency by 55%, on average, and there is no bit error per access during the selectional erasing and after the erase operation.

Figure 23:
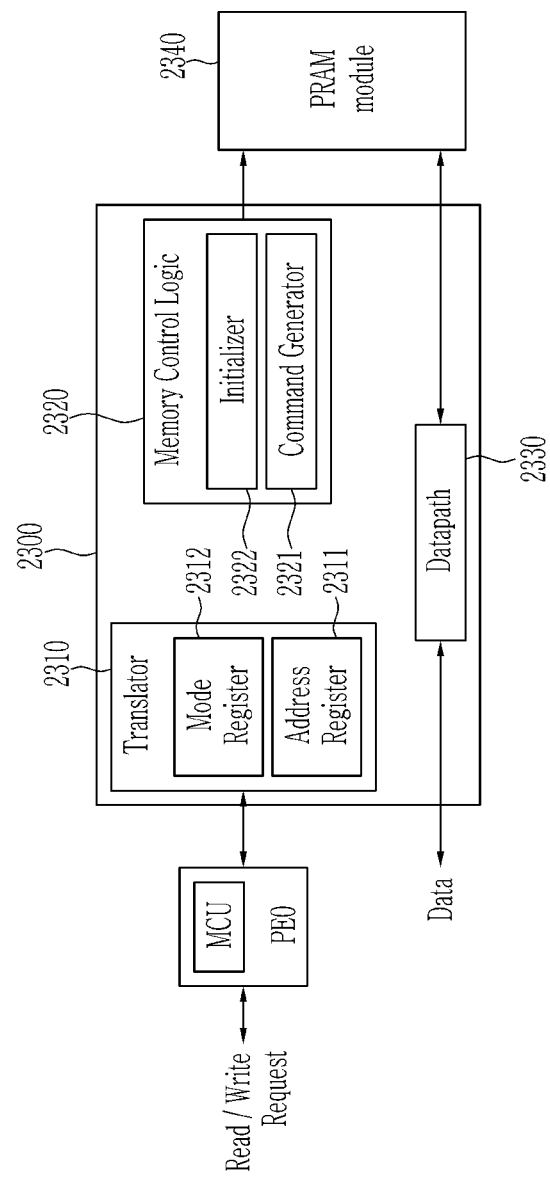
FIG. 23 is a schematic block diagram of a memory controller in a PRAM-based accelerator according to an embodiment of the present invention.

FIG. 23 is a schematic block diagram of a memory controller in a PRAM-based accelerator according to an embodiment of the present invention.

Referring to FIG. 23, a memory controller 2300 includes a translator 2310, a memory control logic 2320, and a datapath 2330.

The translator 2310 includes an address register 2311 and a mode register 2312, which can be linked to a server (PE0 of FIG. 8), for example, an MCU of the server PE0. Each of the address register 2311 and the mode register 2312 may be a 32-bit register. Since data are not written to a memory cell array directly but are first written to a program buffer as described above, the translator 2310 handles an overlay window of a target PRAM module 2340 on behalf of the server PE0, using the address register 2311 and the mode register 2312.

In some embodiments, for a write operation, the translator 2310 may first store a write operation code to a code register (572a of FIG. 11), which is mapped to a predetermined address (e.g., 0x80) of an overlay window base address (OWBA), to inform a memory operation type to the target PRAM module 2340. Then, the translator 2310 may record a target row address at an address register (572b of FIG. 11) which is mapped to a predetermined address (e.g., OWBA+0x8B), and inform a data burst size to the target PRAM module 2340 in terms of bytes through a multi-purpose register (572c of FIG. 11) which is mapped to a predetermined address (e.g., OWBA+0x93). After setting these registers 572a, 572b, and 572c on the overlay window, the translator 2310 may start writing data into the program buffer which is mapped to a predetermined address (e.g., OWBA+0x800), and then execute a write operation by configuring an execute register (572d of FIG. 11) which is mapped to a predetermined address (e.g., OWBA+0xC0). These operations of the translator 2310 may be managed by the memory controller logic 2320 in the same memory controller. For a read operation, the translator 2310 may forward reads to the memory controller logic 2320.

In some embodiments, data for reads and writes may be delivered to the target PRAM module 2340 through 16 data pins (4 bytes per cycle). Since an operand size of load and store instructions that processing elements use is 32 bytes, 256-bit registers for load (read) operation and store (write) operation may be implemented in the datapath 230.

The memory control logic 2320 may include a command generator 2321 and an initializer 2322.

The initializer 2322 may handle all PRAM modules' boot-up process by enabling auto initialization and calibrating on-die impedance tasks. After the boot-up process, the initializer 2322 may set up a burst length and the overlay window address by considering the I/O size (e.g., 32 bytes per bank).

The command generator 2321 may handle three-phase addressing and transactions (e.g., LPDDR2 transactions). The command generator 2321 may handle the three-phase addressing and the transactions over a PRAM physical layer (PHY). Since a single operation is split into preactive, activate and read/write phases in the interface of the PRAM module, the command generator 2321 may convert all memory references requested by the translator 2310 into three-phase addressing requests. Specifically, the command generator 2321 may disassemble a target address into an upper address, a lower address, a row buffer address, and a column address. These decomposed addresses may be then delivered to the PRAM module through signal packets (e.g., 20-bit DDR signal packets). The signal packet may include an operation type (2 to 4 bits), a row buffer address (2 bits), a target address (7 to 15 bits) of the overlay window or the target PRAM partition. At the preactive phase, the command generator 2321 may select a target row address buffer by delivering a buffer address (BA) selection signal and store the upper address to the selected row address buffer. In the active phase, the command generator 2321 may signal the lower address and the buffer address to the target PRAM module 2340. Thus, the target row can be activated and the data stored by the program buffer can be delivered and programmed to the target row. In a read, an internal sense amplifier of the target PRAM module may transfer data from the target row to a row data buffer associated with the selected row address buffer.

Next, results measured after implementing a PRAM-based accelerator according to an embodiment of the present invention on a real hardware are described.

For performance evaluation, a memory controller that plugs a 3x nm multi-partition PRAM to 28 nm technology FPGA logic cells is implemented. A PRAM-based accelerator is architected by this memory controller with a commercially available hardware platform that employs parallel embedded cores over a PCIe fabric. Parameters shown in Table 1 are used as the parameters in the read/write timing described with reference to FIG. 18 and FIG. 19. In Table 1, tCK denotes a clock cycle, and BL4, BL8, and BL16 denote burst lengths of 4, 8, and 16, respectively.

In this case, when the memory request interleaving and selectional erasing described with reference to FIG. 20 to FIG. 22 are used, the evaluation results reveal that the PRAM-based accelerator achieves, on average, 47% better performance than advanced heterogeneous computing approaches that use a peer-to-peer DMA between a storage device and hardware accelerators.

TABLE 1

| Parameter | Value | Parameter | Value | Parameter | Value |
| --- | --- | --- | --- | --- | --- |
| RL(cycle) | 6 | tRP(cycle) | 3 | tDQSS(ns) | 0.75-1.25 |
| WL(cycle) | 3 | tRCD(ns) | 80 | tWRA(ns) | 15 |
| tCK(ns) | 2.5 | tDQSCK(ns) | 2.5-5.5 | tBURST(cycle): BL4/BL8/BL16 | 4/8/16 |

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A resistance switching memory-based accelerator configured to be connected to a host including a central processing unit (CPU) and a system memory, the resistance switching memory-based accelerator comprising:

a resistance switching memory module that includes a memory cell array including a plurality of resistance switching memory cells, and stores a kernel offloaded from the host;

an accelerator core including a plurality of processing elements, the kernel being executed by a target processing element among the plurality of processing elements, and at least one of the plurality of processing elements including a memory controller unit (MCU) that exclusively manages a memory request generated in accordance with execution of the kernel by the target processing element; and a memory controller that is connected to the resistance switching memory module, and allows data according to the memory request to move between the resistance switching memory module and the target processing element, in accordance with the memory request transferred from the MCU, wherein the data according to the memory request from the MCU resides in the resistance switching memory-based accelerator; and a network that integrates the accelerator core and the memory controller.

2. The resistance switching memory-based accelerator of claim 1, wherein the target processing element accesses the resistance switching memory module through the memory request without a modification of an existing load/store instruction.

3. The resistance switching memory-based accelerator of claim 1, wherein the MCU is included in a processing element other than the target processing element among the plurality of processing elements.

4. The resistance switching memory-based accelerator of claim 1, wherein the MCU is included in the target processing element.

5. The resistance switching memory-based accelerator of claim 1, wherein the resistance switching memory module further includes a plurality of row data buffers including a first row data buffer and a second row data buffer, wherein the plurality of resistance switching memory cells are divided into a plurality of partitions including a first partition and a second partition, wherein the memory controller processes a first operation according to a first memory request and a second operation according to a second memory request in parallel, the first operation of bringing first data from the first partition to the first row data buffer, and the second operation of moving second data, which have been transferred from the second partition to the second row data buffer, to the target processing element corresponding to the second memory request.

6. The resistance switching memory-based accelerator of claim 1, wherein the resistance switching memory module further includes: a plurality of row address buffers; and
a plurality of row data buffers,
wherein the plurality of resistance switching memory cells are divided into a plurality of partitions;
wherein the memory controller performs three-phase addressing, and
wherein the three-phase addressing comprises:
a preactive phase for storing an upper address of a row address, which is divided into at least the upper address and a lower address, for accessing the resistance switching memory module in accordance with the memory request, to a target row address buffer among the plurality of row address buffers; an active phase for bringing read data from the memory cell array to a target row data buffer among the plurality of row data buffers based on a row address composed by merging the lower address with the upper address stored to the target row address buffer, in a case of a read; and a read/write phase for transferring the read data from the target row data buffer to the target processing element.

7. The resistance switching memory-based accelerator of claim 6, wherein the resistance switching memory module further includes an overlay window including a set of control registers and a program buffer, and wherein in a case of a write, write data are stored to the program buffer at the active phase when the row address is within an address range of the overlay window, and the write data stored to the program buffer are programmed to the memory cell array at the read/write phase.

8. The resistance switching memory-based accelerator of claim 7, wherein the plurality of partitions include a first partition and a second partition, and wherein the memory controller performs the read/write phase for the first partition in accordance with a first memory request while performing the preactive phase and the active phase for the second partition in accordance with a second memory request.

9. The resistance switching memory-based accelerator of claim 1, wherein the memory controller performs selectional erasing for setting a resistance switching memory cells corresponding to addresses to be overwritten by the execution of the kernel to a reset status.

10. The resistance switching memory-based accelerator of claim 9,
wherein the memory controller performs the selectional erasing before the execution of the kernel.

11. The resistance switching memory-based accelerator of claim 1, wherein the MCU stores a memory address of the kernel stored to the resistance switching memory module to a cache of the target processing element as a boot address, for execution of the kernel.

12. The resistance switching memory-based accelerator of claim 11, further comprising a power sleep controller that controls a sleep mode of the target processing element, and wherein the MCU puts the target processing element in the sleep mode using the power sleep controller before storing the memory address of the kernel to the target processing element, and revokes the target processing element using the power sleep controller after storing the memory address of the kernel to the target processing element.

13. The resistance switching memory-based accelerator of claim 1, wherein the target processing element comprises:
an L2 cache;
a first on-chip memory controller that is connected to the MCU, generates the memory request, and transfers the memory request to the MCU; and
a second on-chip memory controller that is connected to the L2 cache, and moves the data between the L2 cache and the resistance switching memory module.

14. The resistance switching memory-based accelerator of claim 1, wherein the resistance switching memory module includes a phase-change memory module, a resistive memory module, or a magnetoresistive memory module.

15. A resistance switching memory-based accelerator configured to be connected to a host including a central processing unit (CPU) and a system memory, the resistance switching memory-based accelerator comprising:
a resistance switching memory module that stores kernels offloaded from the host, and includes a plurality of resistance switching memory cells divided into a plurality of partitions including a first partition and a second partition, and a plurality of row data buffers including a first row data buffer and a second row data buffer;
an accelerator core including a plurality of processing elements, each kernel being executed by a corresponding target processing element among the plurality of processing elements, and at least one of the plurality of processing elements including a memory controller unit (MCU) that exclusively manages memory requests generated in accordance with execution of each kernel by the target processing element; and
a memory controller that is connected to the resistance switching memory module, and processes a first operation in accordance with a first memory request and a second operation in accordance with a second memory request in parallel, the first operation of bringing first data from the first partition to the first row data buffer, and the second operation of moving second data from the second row data buffer to the target processing element corresponding to the second memory request, wherein the first data according to the first memory request resides in the resistance switching memory-based accelerator and the second data according to the second memory request resides in the resistance switching memory-based accelerator; and a network that integrates the accelerator core and the memory controller.

16. The resistance switching memory-based accelerator of claim 15, wherein the second data have been transferred from the second partition to the second row data buffer before the memory controller brings the first data from the first partition to the first row data buffer.

17. The resistance switching memory-based accelerator of claim 15, wherein the memory controller performs three-phase addressing including a preactive phase, an active phase, and a read/write phase, and wherein the read/write phase for the second data is performed while the preactive phase and the active phase for the first data are performed.

18. A resistance switching memory-based accelerator configured to be connected to a host including a central processing unit (CPU) and a system memory, the resistance switching memory-based accelerator comprising:

a resistance switching memory module that stores a kernel offloaded from the host and includes a memory cell array including a plurality of resistance switching memory cells;

an accelerator core including a plurality of processing elements, the kernel being executed by a target processing element among the plurality of processing elements and at least one of the plurality of processing elements including a memory controller unit (MCU) that exclusively manages memory requests generated in accordance with execution of the kernel by the target processing element;

a memory controller that is connected to the resistance switching memory module, allows data according to the memory request to move between the resistance switching memory module and the target processing element in accordance with the memory request transferred from the MCU, and programs predetermined data for addresses of the memory cell array to be overwritten by the execution of the kernel, wherein the data according to the memory request from the MCU resides in the resistance switching memory-based accelerator; and a network that integrates the accelerator core and the memory controller.

19. The resistance switching memory-based accelerator of claim 18, wherein the predetermined data are data for setting resistance switching memory cells corresponding to the addresses to a reset status.

* * * * *